(12) United States Patent
Sternberg et al.

(10) Patent No.: US 8,296,086 B2
(45) Date of Patent: Oct. 23, 2012

(54) METHOD FOR MEASURING ABSOLUTE MAGNITUDES AND ABSOLUTE PHASE RELATIONSHIPS OVER A WIDE BANDWIDTH

(76) Inventors: Ben K. Sternberg, Tucson, AZ (US); Steven L. Dvorak, Tucson, AZ (US)

( * ) Notice: Subject to any disclaimer, the term of this patent is extended or adjusted under 35 U.S.C. 154(b) by 0 days.

(21) Appl. No.: 13/416,081

(22) Filed: Mar. 9, 2012

(65) Prior Publication Data

US 2012/0161749 A1    Jun. 28, 2012

Related U.S. Application Data

(63) Continuation of application No. 12/235,217, filed on Sep. 22, 2008, now Pat. No. 8,155,904.

(51) Int. Cl.
*G01R 13/00* (2006.01)
(52) U.S. Cl. ......................................................... 702/66
(58) Field of Classification Search ...................... 702/66
See application file for complete search history.

(56) References Cited

U.S. PATENT DOCUMENTS

2010/0110307 A1 *   5/2010   Leme et al. .................... 348/731
* cited by examiner

*Primary Examiner* — Aditya Bhat
(74) *Attorney, Agent, or Firm* — Meschkow & Gresham, P.L.C.

(57) ABSTRACT

A new measurement system, with two receiver channels per measurement port, has been developed that provides absolute magnitude and absolute phase relationship measurements over wide bandwidths. Gain ranging is used at RF to provide optimum noise performance and a swept YIG preselector filter is used to avoid spurious signals. A new absolute vector error correction method is used to calibrate the measurement system in order to allow for absolute vector measurements, and it also removes the time-varying responses caused by the swept YIG preselector filters. A quasi-reciprocal mixer with a characterized non-reciprocal ratio is used to provide the absolute calibration standard. The two receiver channels can be adapted to a wide variety of applications, including wide bandwidth vector signal analyzer measurements, mixer measurements, and harmonic measurements. The two-channels can also be used as an absolute calibrated transmitter/reflectometer.

2 Claims, 14 Drawing Sheets

| Summary of WAVES calibration steps for wideband receiver measurement applications. | | |
|---|---|---|
| Step | Explanation | Signal Paths |
| 1 | Factory calibration of mixer non-reciprocal ratio and transmitter DAC. | |
| 2 | Baseband calibration. | 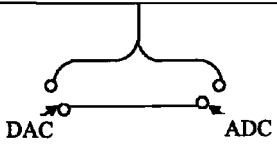 |
| 3 | Simultaneous calibration of: <br><br> a). Relative reflection coefficient for $Rx_L$ and $Rx_R$. Use Tx → $Rx_L$ and $Rx_R$ at freq $f_\alpha$. <br><br> b). Absolute calibration of incoming and outgoing vector voltages at freq $f_\alpha$. Use Tx → $Rx_L$, Cal, and $Rx_R$ at freq $f_\alpha$ and simultaneously use Cal → RxR at freq $f_\alpha$ + small freq offset. <br><br> Cal uses a quasi-reciprocal mixer with a characterized non-reciprocal ratio to provide an absolute standard. | 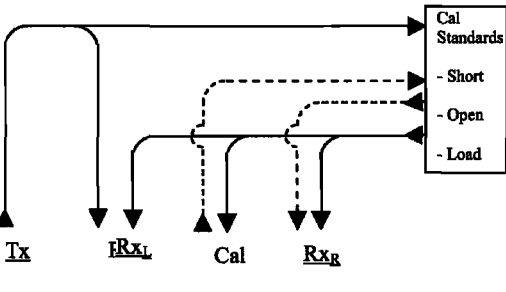 |
| 4 | For offset frequency measurements, repeat step 3 at 2$^{nd}$ frequency, $f_\beta$. | |
| 5 | Use known Cal signal to absolutely cal $Rx_L$ at $F_\beta$. Note, $Rx_R$ at $f_\alpha$ (ref freq) has not changed. <br><br> Can use this Cal, with just a short, to calibrate subsequent receiver gain/phase changes, including YIG changes. Steps 3-4 do not need to be repeated if front end doesn't change. | 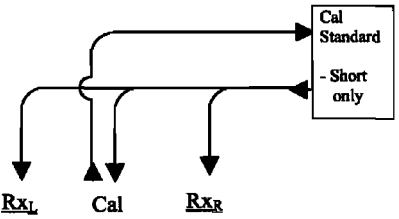 |
| WAVES measurement for wideband receiver measurement applications. | | |
| 1 | Simultaneously measure $f_\alpha$ in $Rx_R$ and $f_\beta$ in $Rx_L$ using a common LO and absolutely calibrated receivers |  |

*FIG. 5*

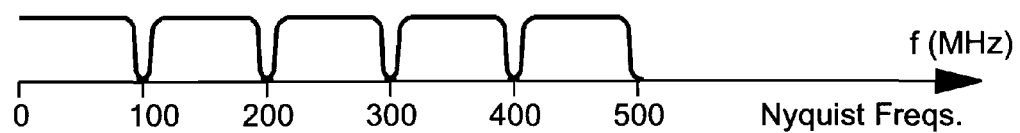
a. IF filter bank for the 200 MS/s clocked ADC
b. IF filter bank for the 171.4 MS/s clocked ADC
*FIG. 13*

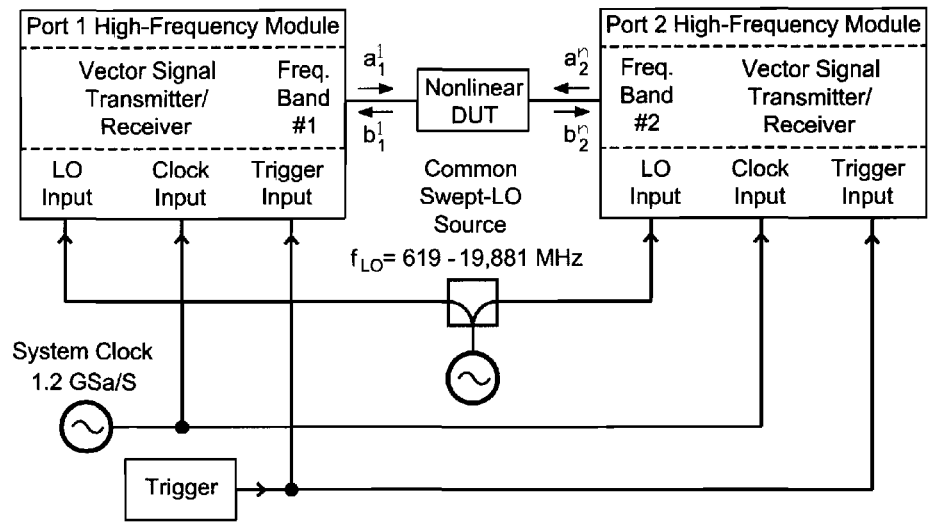
*FIG. 15*
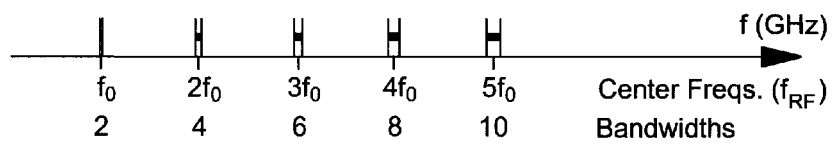
a. DUT RF harmonics
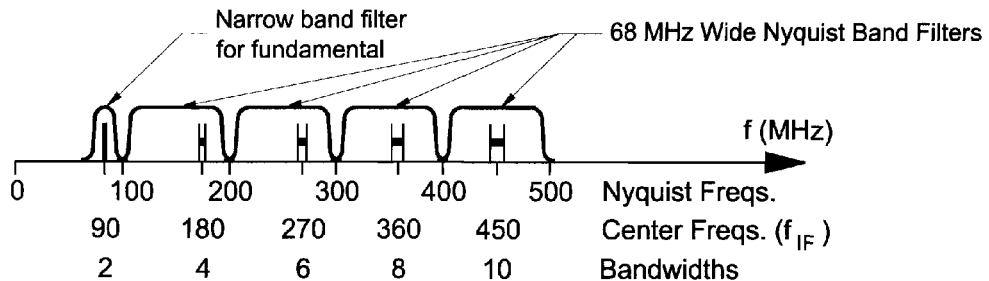
b. DUT RF Harmonics downconverted to the IF filter bank
*FIG. 16*

METHOD FOR MEASURING ABSOLUTE MAGNITUDES AND ABSOLUTE PHASE RELATIONSHIPS OVER A WIDE BANDWIDTH

The present invention is a continuation of "Vector Signal Measuring System, Featuring Wide Bandwidth, Large Dynamic Range, And High Accuracy," Ser. No. 12/235,217, filed 22 Sep. 2008, which claims benefit to U.S. Provisional Patent Application Ser. No. 60/997,769, filed 5 Oct. 2007, which is incorporated herein by reference.

TECHNICAL FIELD

The present invention relates to the field of signal measurement. More specifically, the present invention relates to the field of integral and simultaneous signal measurement and measurement device calibration.

BACKGROUND ART

We have designed a fundamentally new instrument, which combines the capabilities of three instruments in a unique manner that overcomes the limitations of each instrument:

A) Spectrum Analyzers (SAs) provide absolute magnitude measurements over a wide bandwidth (e.g. 2-20 GHz) and can provide absolute phase relationship measurements over a small instantaneous bandwidth (e.g. approximately 50 MHz). SAs have the following advantages: high dynamic range (e.g. 150 dB), they can use narrow-band RF filtering for preselection to avoid spurious signals, and they can use preamplifiers for optimum noise figure. SAs have the following limitations: The instantaneous bandwidth over which phase can be measured may be much too small for current wide-bandwidth applications. In addition, the RF preselection filters can lead to unacceptable measurement errors (e.g. several dB and tens of degrees) in certain applications.

B) Vector Network Analyzers (VNAs) can provide relative S-parameter measurements over a wide bandwidth (e.g. 2-20 GHz). VNAs have the following advantages: relative vector error correction and high accuracy (0.1 dB and 1 degree). Conventional VNAs have the following limitations: There is no absolute phase relationship measurement between different frequencies. Also, there is no swept preselection filter to eliminate spurious signals.

C). Sampling oscilloscopes are used for absolute magnitude and absolute phase relationship measurements over wide bandwidths (e.g. 1 to 20 GHz). A serious limitation of sampling oscilloscopes is the limited dynamic range inherent in this technology (e.g. 20 to 40 dB with practical data-acquisition times). Several other related instruments, such as the Large Signal Network Analyzer, use a down-conversion circuit, which is based on the same principle as the sampling oscilloscope, and which have the same limited dynamic range.

The new Wideband Absolute VEctor Signal (WAVES) measurement system uses two receiver channels per measurement port, and provides absolute magnitude and absolute phase relationship measurements over wide bandwidths (e.g. approximately 2 GHz). Gain ranging is used at RF to provide optimum noise performance and a swept YIG preselector filter is used to avoid spurious signals. A new Absolute Vector Error Correction (AVEC) method is used to calibrate the WAVES measurement system in order to allow for absolute vector measurements and it also removes the time-varying responses caused by the swept YIG preselector filters. The WAVES measurement system, therefore, has all the advantages of both the SA and the VNA instruments, without any of the limitations.

A sampling oscilloscope and a quasi-reciprocal mixer with a characterized non-reciprocal ratio are used at RF to provide the absolute calibration standard for the WAVES measurement system. Since the sampling oscilloscope is used only with known, high signal-to-noise calibration signals, there are no problems with the limited dynamic range of the sampling scope.

The two receiver channels in the WAVES receiver can be adapted to a wide variety of applications, including wide bandwidth vector signal analyzer measurements, network analyzer measurements, mixer measurements, and harmonic measurements. The two-channels can also be used as an absolute calibrated transmitter/reflectometer.

BRIEF DESCRIPTION OF THE DRAWINGS

A more complete understanding of the present invention may be derived by referring to the detailed description and claims when considered in connection with the Figures, wherein like reference numbers refer to similar items throughout the Figures, and:

FIG. 5 shows a summary of the AVEC calibration steps with a preferred embodiment of the present invention;

FIG. 13 shows a diagram illustrating the IF filter banks in the low-frequency transmitter/receiver module illustrated in FIG. 12 with a preferred embodiment of the present invention;

FIG. 15 shows the setup for making vector measurements of the harmonics for nonlinear DUTs with a preferred embodiment of the present invention; and FIG. 16 shows a diagram illustrating the down-conversion of the RF harmonics to the IF bands with a preferred embodiment of the present invention.

BEST MODES FOR CARRYING OUT THE INVENTION

1 Overview of the WAVES Measurement System 1.1 Introduction

Currently there are no test instruments that combine wide bandwidth with large dynamic range and high absolute accuracy for vector signal measurements. This capability is vital for test and measurement in such diverse fields as communications, sensing, and imaging. In order to provide this capability, we have developed a new Wideband Absolute VEctor Signal (WAVES) measurement system that is combined with an Absolute Vector Error Correction (AVEC) technique. This patent describes the characteristics of this WAVES measurement system Our objectives are: (1) Make vector (absolute amplitude and phase relationship) measurements over a wide bandwidth. (2) Obtain the large dynamic range typically found in spectrum analyzers, where only absolute amplitude is usually measured during a frequency sweep. (3) Obtain the high accuracy, typically found in vector network analyzers, where amplitude ratios and phase differences at only one frequency are successively measured during a frequency sweep.

In this patent we first provide a summary of the unique features in the WAVES measurement system that overcomes these limitations. Later we demonstrate how a transmitter (Tx), a bidirectional transmitter/receiver (Tx/Rx) signal path, and two unidirectional receiver (Rx) paths can be used together with Short, Open, and Load (SOL) standards for the AVEC calibration of a Tx/Rx module. Once calibrated, this Tx/Rx module can then provide accurate vector measurements of the signals that are flowing into and/or out of the test port. Next we show how the AVEC technique can be extended to the vector calibration of real receivers that involve frequency conversion mixers. Since mixers are inherently non-reciprocal, we use a Characterized Non-Reciprocal (CNR) mixer in a bidirectional Tx/Rx signal path to provide an absolute standard. We then show how to calibrate a system that allows for wideband absolute phase relationship measurements of periodic modulated signals; provided that the same Local Oscillator (LO) is employed for the two down-conversion receivers and different Radio Frequencies (RFs) and Intermediate Frequencies (IFs) are employed in these receivers. Finally, we have shown that the non-reciprocal mixer's CNR is a very stable quantity even with changes in time and temperature. Since it is stable, the mixer's CNR can be measured at the factory, and then used as an absolute standard in the bidirectional Tx/Rx signal path, in order to provide vector calibration of the system.

Figure 1:
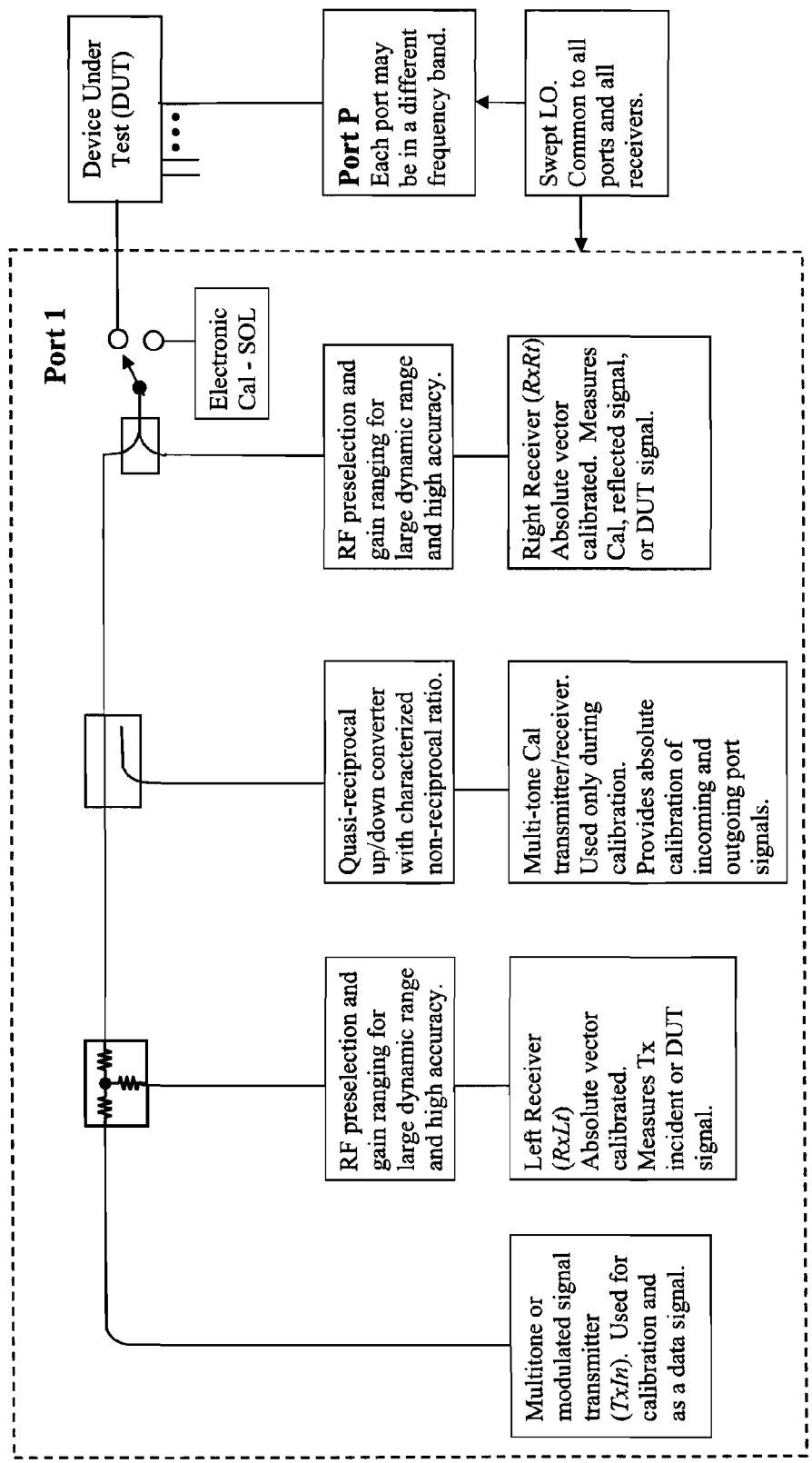
FIG. 1 shows the Wideband Absolute Vector Signal measurement system block diagram with a preferred embodiment of the present invention.

FIG. 1 shows a block diagram of the WAVES measurement system. Left and right receiver channels (RxLt and RxRt) are used to simultaneously measure 36 MHz instantaneous bandwidths of a triggered and repeatable wideband signal (e.g. approximately 2 GHz bandwidth and 2-20 GHz center frequency). One receiver (e.g. the left receiver) is used to repeatedly measure a single reference frequency band within the wideband signal. The other receiver successively measures adjacent 36 MHz bandwidths, with 2 MHz overlaps, until the full signal bandwidth is measured. The receivers measure both absolute magnitude and absolute phase relationships between signals at different frequencies.

In order to obtain very high accuracy measurements, with minimum spurious signals, a swept YIG preselector is used to select a specific band of frequencies for analysis. The YIG bandwidth is at least 40 MHz wide to ensure that the full 36 MHz analysis interval is included. Gain ranging at RF is also used to provide the best possible noise figure.

The swept YIG preselector has a large time-varying, and unknown, frequency response. The gain ranging may also suffer from a time-varying frequency response. In order to efficiently calibrate this frequency response, a new Absolute Vector Error Correction (AVEC) procedure has been developed. A key component of the AVEC procedure is the use of a quasi-reciprocal up/down conversion mixer, with a characterized non-reciprocal ratio, to provide a known absolute magnitude and phase standard at RF and microwave frequencies. Sections 1.2 through 1.4 will discuss the key components of this system in greater detail.

Figure 2:
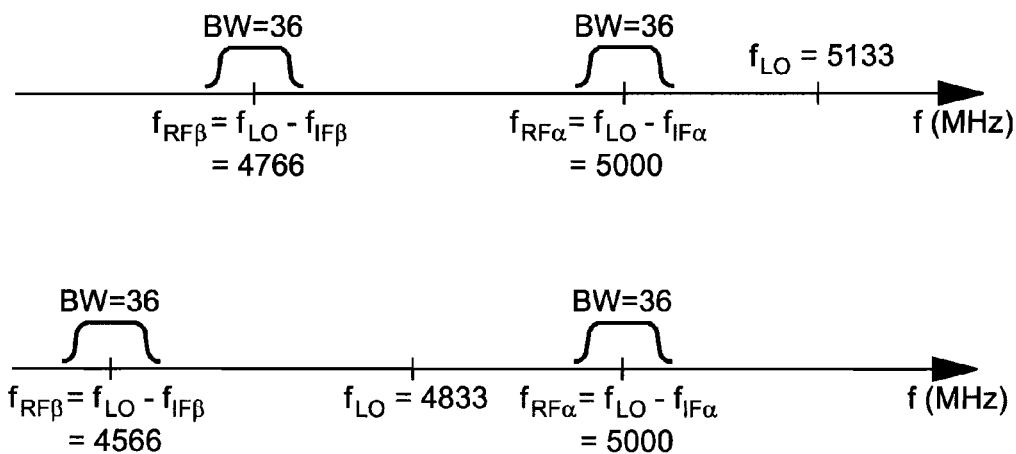
FIG. 2 shows an example of how to make wideband relative phase measurements with a preferred embodiment of the present invention.

1.2. Use of a Common LO to Establish a Phase Relationship between Wideband Signals In order to make offset-frequency measurements over a continuous and wide bandwidth, we have developed a procedure that uses a common LO for the two receiver channels, and employs the upper and/or lower mixer sidebands along with a varying IF frequency. FIG. 2 shows an example of how to make wideband relative phase measurements where we have assumed that the measurement band is below the reference band. Changes in the LO and IF frequencies, together with variable YIG filters, are used to sequentially move the center frequency of the measurement band $f_{RF\beta}$ while keeping the reference band fixed, i.e., $f_{RF\alpha}$=5000 MHz. Note that the unknown LO phase drops out when relative measurements are made since a common LO is employed for the two receivers.

In FIG. 2a, close-in measurements (i.e., up to $f_{RF\alpha}$±252 MHz) are made using the same mixer sidebands. Here a signal at 4766 MHz is compared with the reference band at 5000 MHz by using the two lower mixer sidebands, a common 5133 MHz LO, and then measuring the IF signals at 367 MHz and 133 MHz on the two receiver channels. In FIG. 2b wideband measurements (i.e., up to $f_{RF\alpha}$±952 MHz) are made using two different mixer sidebands. In order to measure these more widely separated RF signals on the two receiver channels, a 4833 MHZ LO is used and the lower sideband signal at 4566 MHz is now compared with the upper sideband signal at 5000 MHz. This time, the IF frequencies are 267 MHz and 167 MHz. The basic idea in both of these cases is to compare successive measurements of the signal content in sequentially frequency-stepped measurement bands with those in a fixed-frequency reference band. In addition to the common LO, we require that the baseband frequencies, which are up-converted to RF to create the transmitter signal, must be repeatable, clocked, and triggered.

Figure 3:
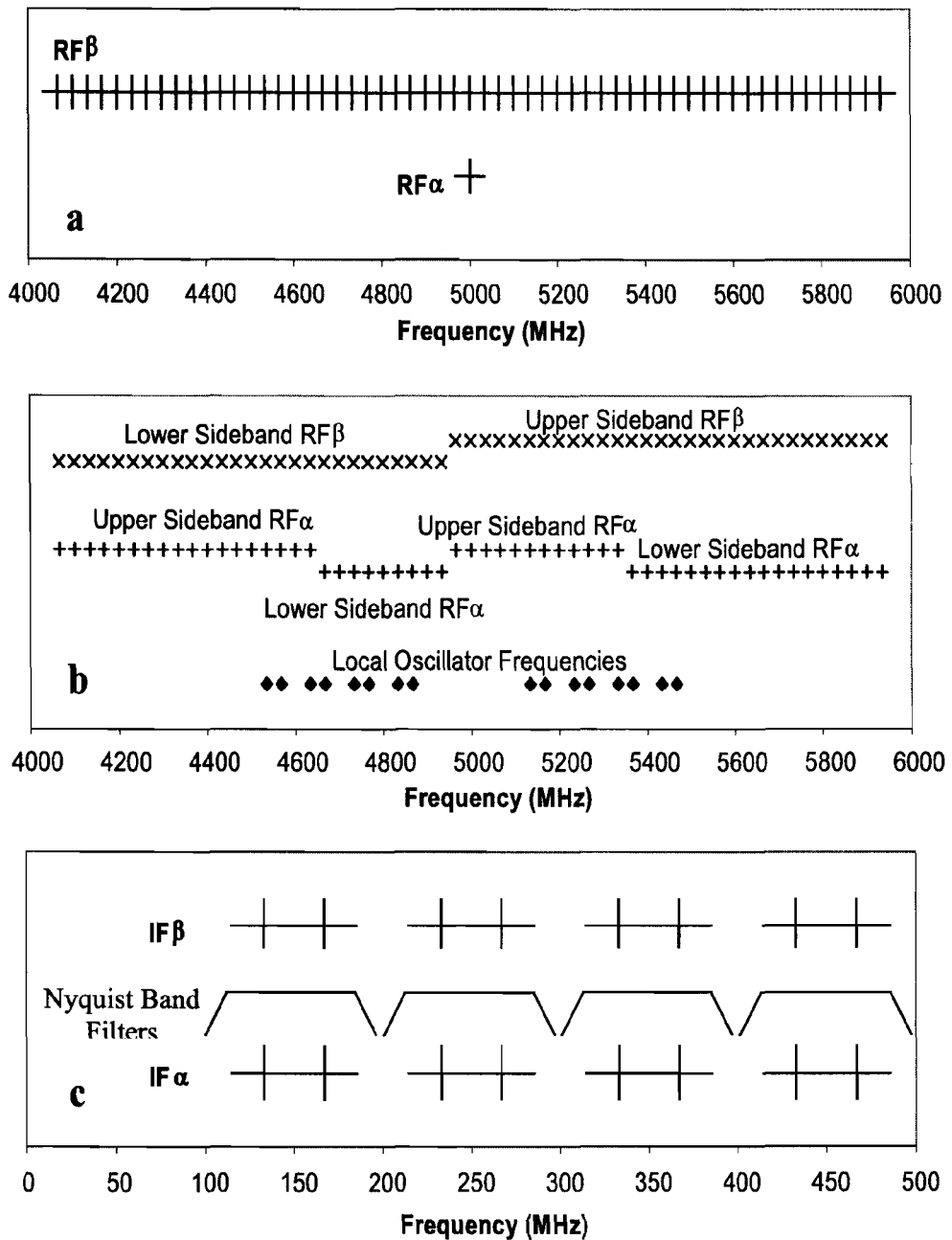
FIG. 3 shows a schematic of offset-frequency measurement with a preferred embodiment of the present invention.

As shown in FIG. 3, by using different combinations of the upper and/or lower mixer sidebands, the common LO frequency, and the IF frequencies on the two receivers, the absolute magnitude and absolute phase relationship of the wideband signal is measured over a 1904 MHz bandwidth by successively measuring 36 MHz instantaneous bandwidths 57 times where there are either 2 or 4 MHz overlaps between the measurements. Note that by using more IF filters in this scheme it is possible to attain even higher bandwidths than 1904 MHz. For each of these stepped measurements of the wideband signal, a selected reference frequency in the wideband signal is simultaneously measured. This provides the desired absolute phase relationship over the entire signal bandwidth. Obviously, this method requires a repeatable, triggered signal, just like the sampling oscilloscope. This method, however, provides far greater dynamic range and accuracy than the sampling oscilloscope and its variants. A reference frequency (RFα) of 5000 MHz is used in the example shown in FIG. 3. FIG. 3a shows the measured RF frequencies. Each vertical mark indicates the center frequency of the RF measurement. Each horizontal line segment indicates the 36 MHz instantaneous measurement bandwidth, with 2 or 4 MHz of overlap for each measurement. A total bandwidth of 1904 MHz is sequentially measured. The phases of all sequential RFβ measurements are related to the phase measurements at RFα. FIG. 3b shows that a measurement of this absolute phase relationship over such a wide bandwidth is made possible by adjusting the local oscillator frequency, and the choice of RFα and RFβ sideband, as shown on the middle panel. FIG. 3c shows the measured IF frequencies. Each vertical line indicates the center frequency for each measurement band. Each horizontal line segment indicates the 36 MHz measurement bandwidth, with 2 MHz of overlap, for a total of 70 MHz in each Nyquist band. The Nyquist band filters separate each pair of IF bands prior to digitization by the 200 MS/S ADC.

1.3. Detailed Description of the WAVES Measurement System

Figure 4:
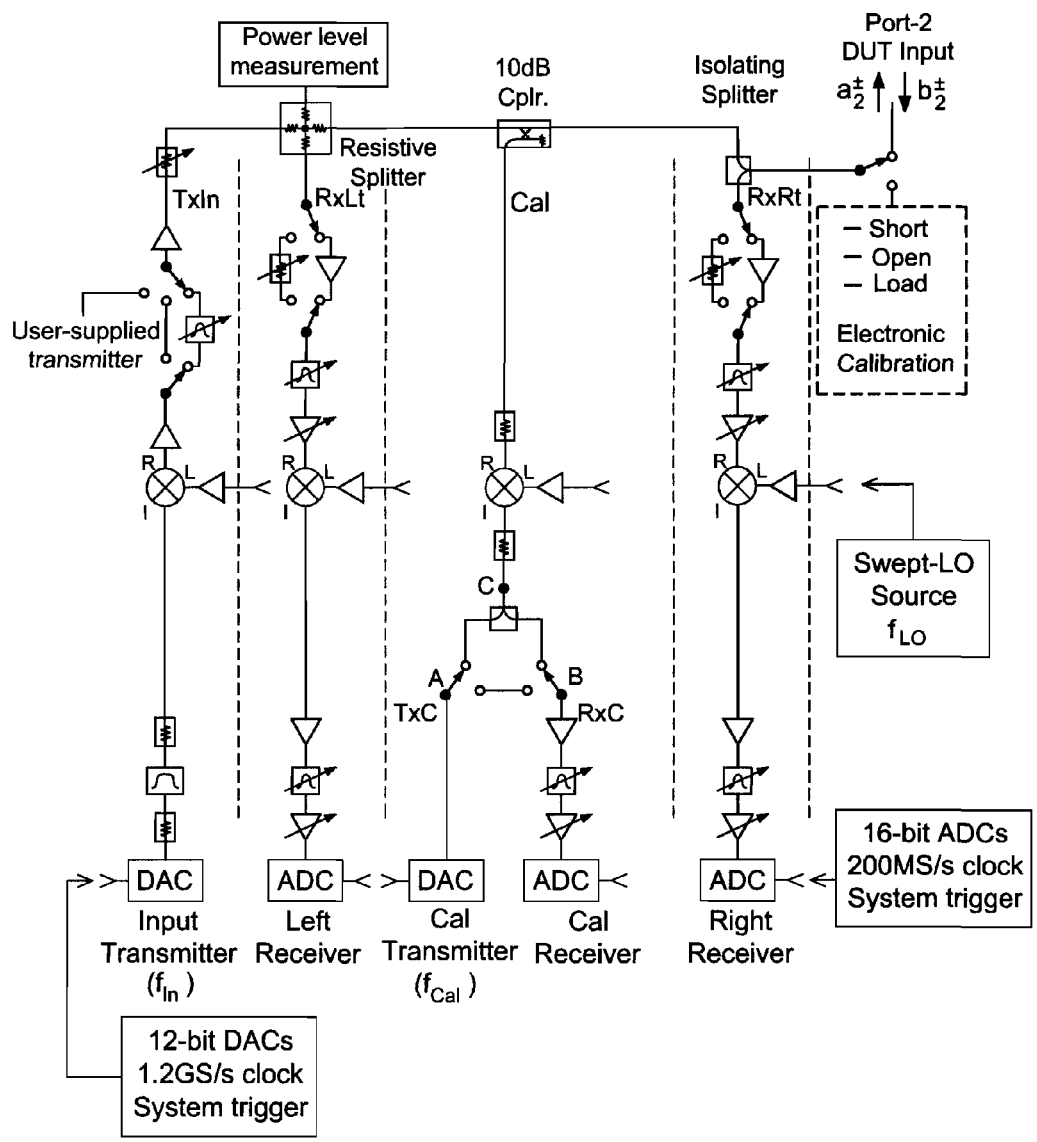
FIG. 4 shows the Wideband Absolute Vector Signal (WAVES) measurement system circuit diagram for the 2-20 GHz configuration with a preferred embodiment of the present invention.

FIG. 4 shows the Wideband Absolute Vector Signal (WAVES) measurement system circuit diagram for the 2-20 GHz configuration. We will describe the important circuit elements in detail, beginning at the left hand side and moving to the right.

The first column is the transmitter (TxIn). A high-speed Digital-to-Analog Converter (DAC) is used to create multi-tone or modulated signals. Note that this DAC has a clock and trigger signal, which must be common to all DACs and Analog-to-Digital Converters (ADCs) in the system. The DAC signals are up-converted using the common LO. For some measurements, the output of the mixer is filtered with a swept tracking YIG filter. For wideband signal measurements, which use the upper and lower sidebands of the signal, a YIG bypass is selected. There is also an option for a user-supplied transmitter signal.

The second column is the left receiver (RxLt). A resistive four-way splitter is used in this leg so that the incident signal and the data signal from the DUT can be measured without switching the connections. If a switch were used, the signal flow graph would change with each setting, which would greatly complicate the calibration procedure. One of the legs of this splitter is used to continuously monitor power levels from the DUT and the transmitter, so that we can ensure that the receiver is always operated in a linear region. A low-noise amplifier may be switched into the left receiver for optimum noise figure measurements, or a variable attenuator may be used for high-power signals. Since the YIG preselector can handle very large out of band signals (greater than +20 dBm) and still pass the in-band signal linearly, a low attenuator setting may be chosen in order to obtain the optimum noise figure for small in-band signals in the presence of very large out-of-band interfering signals. The swept tracking YIG filter is used to avoid spurious signals, and gain ranging at both RF and IF is used to provide the optimum signal-to-noise ratio. A set of 4 switched bandpass filters at baseband are used to obtain the wideband analysis described in Chapter 3. One additional filter (90 MHz center frequency and 1 MHz bandwidth) may be used for narrow-band measurements and further dynamic range improvement in the case of nearby interfering signals. The signal is digitized by a 200 MS/S, 16 bit ADC, The bank of 4 switched baseband filters limits the input to the ADC to one of 4 Nyquist bands (see FIG. 3c). The use of Nyquist bands in the ADC allows a spurious-free dynamic range of typically greater than 70 dB at even the highest frequencies used in this system. Again, the clock and trigger signals are common to all converters in the system.

When offset-frequency measurements are being made, either the pre-amplifier, or a minimum setting of 10 dB on the input attenuator, must be used in the RxLt receiver in order to provide isolation of the changing YIG return loss from the rest of the circuit. If this isolation is not provided, the signal flow graphs may change between the selection of the Cal and Data measurements, thereby invalidating the calibration procedure. When only one instantaneous bandwidth of 36 MHz is measured, the additional isolation is not needed since the YIG filter is not switched between CAL and DATA measurements.

The third column is the Calibration or Cal leg, which functions as both a transmitter and receiver (TxC and RxC). The signals are coupled into and out of the signal path with a 10 dB coupler. This leg uses a quasi-reciprocal mixer that allows us to make an absolute calibration of magnitude and phase relationships at RF and microwave frequencies. This quasi-reciprocal mixer is discussed in more detail in later. Briefly, we have found that although mixers are not reciprocal devices, the mixer behavior can be characterized by a non-reciprocal ratio. This characterized non-reciprocal ratio (CNR) is extremely stable with time and temperature. It therefore provides a standard by which we can relate a known absolute signal magnitude and phase relationship at baseband (which is provided by the stable and known DAC output) to a known absolute signal magnitude and phase relationship at RF.

The outgoing Cal signals (TxC) are generated by a DAC, which is identical to the DAC used in the TxIn circuit. The TxC DAC signals are slightly offset in frequency from the TxIn DAC so that both signals can be simultaneously measured during the calibration procedure. This method of using simultaneous calibration signals is known as the Accurate Real Time Total Error Suppression (ARTTEST) method and is described in (Sternberg and Dvorak, 2003; Dvorak and Sternberg, 2003). A single DAC could be switched between the TxIn and the TxC functions, but the calibration procedure would then take twice as long. The incoming Cal signals RxC are measured with a baseband receiver circuit that is identical to the baseband receiver in the RxLt leg. There must be high isolation between the outgoing and the incoming signal, but this is easily accomplished at these low frequencies (115-485 MHz) with a conventional hybrid splitter.

The fourth column in FIG. 4 is the right receiver (RxRt). This leg is similar to the left receiver (RxLt), except that a hybrid splitter is used in this receiver to achieve a very low noise figure.

In the fifth column is a switch between the DUT and the electronic calibration module containing the Short, Open, and Load (SOL) standards. Note that these standards were chosen to simplify the error analysis, however, other characterized standards can also be used. This must be a mechanical switch to handle potentially large powers (up to +30 dBm). With very heavy use of this measurement system, this switch may have a mean time to failure of just over one year. Therefore, a means must be provided for rapid replacement by the user of this relatively low-cost switch. Below the electronic calibration module is shown the local oscillator frequency synthesizer, which operates over a range of 2133-19867 MHz for input signals of 2-20 GHz. This local oscillator signal is common to all receivers and all ports.

1.4. Overview of the Absolute Vector Error Correction (AVEC) Technique

In order to calibrate the time-varying and unknown errors associated with the swept-tracking YIG preselector filters, as well as the variable gain amplifiers and attenuators in the circuit, we have developed a new calibration procedure, which we call the Absolute Vector Error Correction (AVEC) method. FIG. 5 provides a summary of the steps in this procedure. Later we describe the details of this new method and include the mathematical derivations associated with the method.

The first stage (I) in FIG. 5 involves a factory calibration of the mixer non-reciprocal ratio and the Calibrator DAC, and is typically done once per year. Calibration of the mixer non-reciprocal ratio is accomplished with a sampling oscilloscope, which has been calibrated with an electro-optical calibration method, and is placed at the input port of the WAVES measurement system. This provides an absolute calibration of approximately 0.1 dB and 1 degree over 2 to 20 GHz. When the AVEC calibration is applied, there is an unknown complex variable in the calibration equations, which is related to the square root of the mixer characterized non-reciprocal ratio (CNR) times the DAC output. With the calibrated sampling oscilloscope monitoring the outgoing wave, this unknown variable can be determined. We note that the sampling oscilloscope is being used here to measure a constant-amplitude calibration signal and it is feasible to use very long integration times during this factory calibration procedure. This avoids the problems with the limited dynamic range of sampling oscilloscopes.

The second stage (II) in FIG. 5 involves a series of user calibration steps. We begin with calibration of the baseband cal circuit (II-A). This would normally be done once per day and calibrates the baseband circuitry in the calibration leg. The most likely time-varying components in this circuit are the sharp cutoff Nyquist band filters. If the response of these filters varies, more frequent baseband calibrations may be required. The calibration DAC is temporarily switched into the calibration receiver, which includes a variable gain amplifier, a switched filter, and an ADC.

Step II-B in FIG. 5 calibrates changes in the receiver front-end circuitry. This includes the input attenuator and the preamplifier. This calibration must be performed by the user whenever the attenuation or gain is changed.

Step II-B-1 involves a simultaneous calibration of the following:

a). The relative reflection coefficient for RxLt and RxRt: A set of tones, centered about a frequency $f_\alpha$, is transmitted from TxIn to RxLt and RxRt, and measurements are made of the SOL standards.

b). The absolute calibration of the incoming and outgoing vector voltages: A set of tones, centered about a frequency $f_\alpha$, is transmitted from TxIn to RxLt, RxC and RxRt, and measurements are made using the SOL standards. A signal is simultaneously transmitted from TxC to RxRt at a frequency of $f_\alpha$ plus a small frequency offset.

The quasi-reciprocal mixer with a characterized non-reciprocal ratio is used to provide a known absolute magnitude and absolute phase relationship signal at RF using the known absolute magnitude and absolute phase relationship signal at baseband, i.e. the DAC output. This calibration step must be performed for each setting of the receiver, i.e. for each attenuator setting, each YIG setting, and each variable gain setting. Note that for each of these settings we normally acquire a 36 MHz instantaneous bandwidth.

Step II-B-2 in FIG. 5 is used when we are making wideband measurements as described in Chapter 3. All of the stages that were used during Step II-B-1 for $f_\alpha$ are now repeated for the frequency $f_\beta$.

Step II-B-3 then uses the now known TxIn signal to absolutely calibrate RxLt at $f_\alpha$. This is necessary since the LxLt YIG filter has changed since it was previously calibrated. The RxRtYIG filter at frequency $f_\beta$ has not changed, so it does not need to be recalibrated.

We can use just a short calibration, to calibrate subsequent receiver gain/phase changes, including YIG changes, if the front-end circuit (the switched pre-amplifier and attenuator) does not change. Steps I-B-1 and II-B-2 do not need to be repeated in this case. This special case also requires a minimum of 20 dB isolation in the preamplifier or the input attenuator in order for the signal flow graphs to be independent of changes in the YIG return loss as it is switched to different center frequencies.

The WAVES measurement system is now fully calibrated. The RxLt and the RxRt receivers can now be used to record wideband signals with absolute amplitude and absolute phase relationship calibration, as shown in the last row of FIG. 5. Typically, only one probe is calibrated. A thru measurement may then be used to calibrate additional probes for multi-port measurements. Therefore, only one CNR mixer is needed per system.

1.5. Applications of the WAVES Measurement Method

Each WAVES measurement system or port, which contains two receivers, can be used for multiple purposes. In this section, we will summarize some of the possible applications.

a) Signal source with measurement of incident and reflected signals. This provides a conventional network analyzer reflectometer capability with moderate (e.g. 36 MHz) instantaneous bandwidth.

b) Two receivers with the same center frequencies and with instantaneous and moderate bandwidths (e.g. 36 MHz bandwidth). In this case, fundamental mixing is used with the same sideband on the two receivers. Since the left and right receiver paths differ by 10 dB, any measurement system nonlinearities can be detected in real time when the same frequency signals are being measured by the two receivers. We can also add a dynamic calibration signal to each receiver for simultaneous calibration and data collection using the ARTTEST method as described in (Sternberg and Dvorak, 2003; Dvorak and Sternberg, 2003). In this case, the two receivers use dynamic calibration tones at different frequencies so that interference from the data can be removed from the calibration tones and interference from the calibration tones can be removed from the data.

c) Multiple receivers with offset center frequencies, with instantaneous and increased bandwidths. The two receivers in one WAVES measurement system can provide 72 MHz of instantaneous bandwidth. It is also possible to combine 2*N receivers from N ports to provide 2*N*36 MHz instantaneous bandwidth.

d) Receivers with offset center frequencies and with large, but non-instantaneous, bandwidth (e.g. ±952 MHz measured bandwidth). A swept preselector filter on one receiver is used to select a reference band for vector measurements, and the swept preselector filter on the second receiver is used to select another band for analysis at the offset frequencies. Individual measurements are made over 36 MHz bandwidths at multiple times in order to fill up the entire ±952 MHz bandwidth. All measurements are referenced to the fixed reference band. Fundamental mixing is used to down-convert the microwave signals on each receiver to one of the 100 MHz Nyquist bands within the ADC's 500 MHz bandwidth. Combinations of upper and lower mixer sidebands are used to provide the full ±952 MHz analysis bandwidth. A table has been developed to determine which Nyquist band and which mixer sideband is used for each offset frequency.

e) Receivers with offset center frequencies and with full, but non-instantaneous, microwave bandwidth (e.g. 2-20 GHz successively measured bandwidth) at harmonically related frequencies. A swept preselector filter on one receiver is used to select the fundamental frequency, which is used as a reference for vector measurements. The swept preselector filter on the second receiver is used to select successive harmonics for analysis. Individual measurements are made at the reference frequency with 2 MHz bandwidth and at the nth harmonic frequency with bandwidths of 2*n MHz multiple times to successively measure, for example, 5 harmonics. All measurements are referenced to the fixed reference band. Fundamental mixing is used to down-convert the fundamental signal to the fundamental ADC Nyquist band (e.g. 90 MHz center) and nth harmonic mixing is used to down-convert the nth harmonic signal to nth Nyquist band (e.g. n*90 MHz center) within the ADC's 500 MHz bandwidth.

f) This new vector-calibrated instrument can be extended to N-port measurements. This provides absolute magnitude and phase relationships over the full microwave bandwidth (e.g. 2-20 GHz).

g) Application to vector measurements on mixers. A common LO provides a common phase reference for the RF and LO ports for mixer measurements. A triggered Nyquist-band ADC is used to provide the phase reference for baseband DUT measurements, i.e. the IF port (e.g. 1-500 MHz) of a mixer. The 1.2 GS/s system clock is divided by either 6 or 7 to provide either a 200 MS/s or 171.4 MS/s clock input to the Nyquist ADC, thereby allowing for the direct measurement of the 1-500 MHZ IF band. Only one high-frequency synthesizer is needed for all three ports of the mixer.

h) The WAVES measurement system can be used in place of conventional instruments. This includes vector network analyzer (VNA) measurements. In this case, the receiver YIGs can be bypassed to reduce calibration time. It also includes multi-channel, ultra-wideband (e.g. ±952 MHz) spectrum analyzer and vector signal analyzer (VSA) measurements, as well as nonlinear tests of DUT harmonics over a full microwave band (e.g. 2 to 20 GHz).

i) Multiple 2 GHz measurement bands can be combined for full 2-20 GHz coverage. Each measurement band covers approximately 2 GHz. Successive 2 GHz bands can be measured. If these bands overlap in frequency, and if there are measurable frequencies in this overlap region, the bands can be stitched together for complete 2-20 GHz coverage.

j) Additional frequency bands can be covered. The circuit in FIG. 4 shows frequency coverage of 2 to 20 GHz. As will be shown later, other frequency bands (e.g. 0.5 to 2 GHz) can be covered by using additional preselectors and wider bandwidth components in the circuit. The additional frequency bands can also be covered using separate receiver modules.

2.0 A New Absolute Vector Error Correction Technique for a Transmitter/Receiver Module 2.1 Introduction In this chapter we develop a new method that will provide an accurate absolute calibration for the new WAVES Measurement System by using readily available precision standards. The calibrated WAVES Measurement System can then be used for Spectrum Analyzer (SA), Vector Signal Analyzer (VSA), and Vector Network Analyzer (VNA) type measurements.

SAs and VSAs typically rely on factory calibrations at yearly intervals for their specified accuracies. This leads to quite limited accuracy specifications. For example, specified SA amplitude accuracies may vary from ±1 dB to as much as ±10 dB over the full range of measured frequencies and amplitudes. This level of accuracy is not acceptable in many applications.

In order to overcome the limitations of currently available instruments, we have developed a new WAVES Measurement System that includes a transmitter (Tx), a reciprocal transmitter/receiver (Tx/Rx) signal path, and two unidirectional receiver (Rx) paths that can be used together with Short, Open, and Load (SOL) standards for the Absolute Vector Error Correction (AVEC) of the system. Because of the unique WAVES system topology, we will use modified VNA signal-flow graphs, along with an added reciprocal measurement path, to develop the AVEC technique for the absolute vector calibration of the WAVES Measurement System. The calibrated WAVES Measurement System can then be used to make accurate wideband VSA and SA measurements, as well as VNA-type measurements on both linear and Frequency Translating Devices (FTDs).

We first develop the signal-flow graphs for the test circuit and show how the unknown error terms can be determined by making measurements on Short, Open, and matched Load (SOL) standards. In order to simplify the analysis, we analyze a baseband system in this chapter. Then in the next chapter we show how the AVEC technique can be extended to the vector calibration of real receivers that involve frequency conversion mixers. Since mixers are inherently non-reciprocal, we use a Characterized Non-Reciprocal (CNR) mixer in a bidirectional Tx/Rx signal path to provide an absolute standard. We then show how to calibrate a system that allows for wideband absolute phase relationship measurements of periodic modulated signals; provided that the same Local Oscillator (LO) is employed for the two down-conversion receivers and different Radio Frequencies (RFs) and Intermediate Frequencies (IFs) are employed in these receivers. We have shown that the non-reciprocal mixer's CNR is a very stable quantity even with changes in time and temperature. Since it is stable, the mixer's CNR can be measured at the factory, and then used as an absolute standard in the bidirectional Tx/Rx signal path, in order to provide vector calibration of the system.

The terminology "absolute vector measurements" means that the magnitudes and phases of the measured signals can be related to traceable national standards. In general, the term "absolute phase" will mean that an absolute phase relationship is established between signals that are measured at different frequencies. However, in the simplified baseband test circuit that is discussed in this patent, the absolute phase relationship between the signals at different frequencies is established by relating the signal phase at the port output to the known phase of the transmitter.

2.2 Standard 1-Port VNA Error Model

Figure 6:
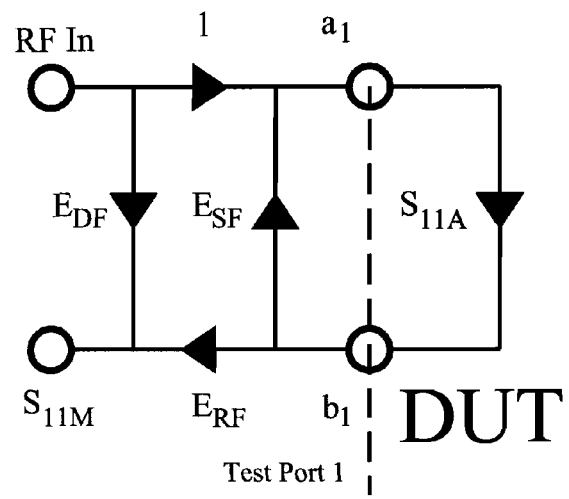
FIG. 6 shows the standard 3-term, error model for VNAs with, a preferred embodiment of the present invention.

Static error correction techniques are based on signal-flow diagrams that model the propagation, characteristics of the circuit. The standard signal-flow diagram for the 3-term error model that is often employed for 1-port measurements in VNAs is shown in FIG. 6 for forward measurements. This error model accounts for directivity errors ($E_{DF}$), source-mismatch errors ($E_{SF}$), and tracking errors ($E_{RF}$). Application of a signal-flow analysis to FIG. 6 yields an expression for the "actual" scattering parameter (i.e., $S_{11A}$) for the DUT that is represented in terms of the measured scattering parameter (i.e., $S_{11M}$) and the error terms, i.e., $$S_{11A} = \frac{S_{11M} - E_{DRIF}}{(S_{11M} - E_{DRIF})E_{SmF} + E_{RfF}}, \quad (1)$$

$$E_{DRIF} = S_{11M}^L, \quad (2)$$

$$E_{SmF} = \frac{S_{11M}^S + S_{11M}^O - 2S_{11M}^L}{S_{11M}^O - S_{11M}^S}, \quad (3)$$

$$E_{RfF} = \frac{2(S_{11M}^O - S_{11M}^L)(S_{11M}^S - S_{11M}^L)}{(S_{11M}^S - S_{11M}^O)}. \quad (4)$$

Note that this calibration procedure only provides a relative calibration, i.e., it allows for an accurate measurement of the reflected wave relative to the incident-wave, which exists at the same frequency. It does not allow for the measurement of the absolute amplitude of the signal at the DUT's input port. Nor does it provide an absolute phase relationship between the input signals at different frequencies.

A power meter can be used to calibrate the system so that the absolute output power level is known. For example, the absolute output power can be measured provided that the reflection tracking error in the standard 3-term error model is written as the product of separated source transmission and reflection tracking errors. An additional measurement during the calibration procedure with a power meter then allows the magnitudes of these individual tracking errors to be determined. However, this technique doesn't, provide any information about the phase of the output voltage.

2.3 Overview of the Absolute Vector Error Correction Technique

The AVEC technique that is developed in this patent evolved from the research discussed in (Sternberg and Dvorak, 2003; Dvorak and Sternberg, 2003). In these patents, an Accurate, Real-Time, Total-Error-Suppression Technique (ARTTEST) method is developed and applied to the design of a VNA. One key element in the prototype ARTTEST VNA is the presence of a reciprocal Link leg that provides magnitude and phase references between the two measurement ports. This reciprocal Link leg carries two frequency-offset signals that travel in opposite directions through the cable. The presence of these two signals allows for the measurement of the vector transmission characteristics of this cable, thereby providing a stable reference between the two ports. In this chapter, we demonstrate that a reciprocal path can also be used to obtain an absolute vector calibration for a 1-port transmitter/receiver module. We will refer to this novel absolute calibration technique as the AVEC method.

For simplicity, we demonstrate the AVEC method on a 1-port baseband test circuit (see FIG. 7) that does not include frequency up- and down-conversion mixers in this section of the patent. Later, we extend the AVEC technique to higher frequency circuits that involve mixers and show how to modify the AVEC technique in order to account for the non-reciprocity inherent in mixers.

2.4 Absolute Vector Error Correction (AVEC) Technique

Figure 7:
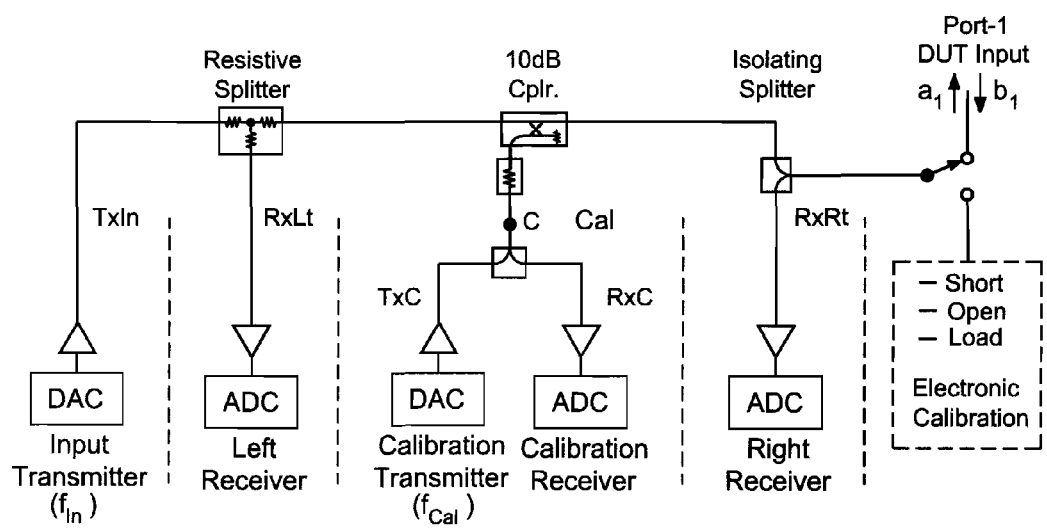
FIG. 7 shows a simplified baseband circuit used to test the AVEC method with a preferred embodiment of the present invention.
Figure 8:
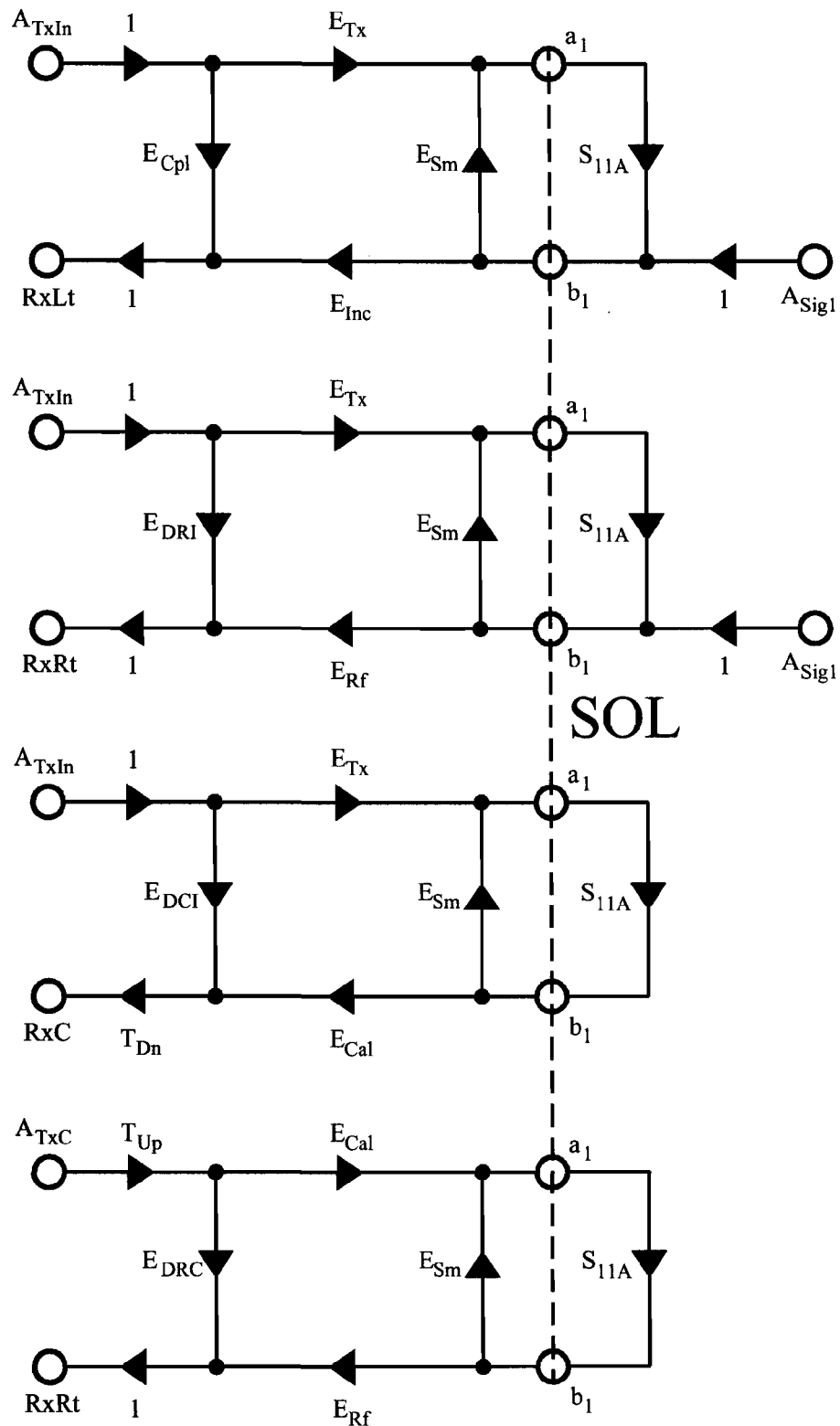
FIG. 8 shows the signal-flow graphs for the 1-port baseband AVEC method with a preferred embodiment of the present invention.

During the AVEC calibration procedure, tones are simultaneously transmitted from the input and calibration transmitters at the frequencies $f_{In}$ and $f_{Cal}$, respectively (see FIG. 7). These signals are then reflected off of SOL calibration standards and measured in the left, calibration, and right receivers. We have chosen to employ the four signal-flow graphs that are shown in FIG. 8 to model the various signal paths in the circuit shown in FIG. 7. As shown below, the error terms in these signal-flow graphs, which are defined in Table 1, are determined by using the signals that are measured for the SOL calibration standards. Note that the four signal-flow graphs in FIG. 8 have common transmission paths that are modeled by $E_{Tx}$, $E_{Rf}$ and $E_{Cal}$. It is these common transmission paths that allow for the absolute calibration of the outgoing and incoming vector voltages, i.e., see $a_1$ and $b_1$ in FIG. 7.

2.4.1 Calibration of the Relative Reflection Coefficient

In order to calibrate the system for relative reflection coefficient measurements, the input transmitter (TxIn) signal is measured in the left (RxLt) and right (RxRt) receivers. The top two signal-flow graphs in FIG. 8 are associated with the measurement of the incident and reflected signals, respectively, i.e., $$\rho_{Inc} = \frac{RxLt(f_{In})}{A_{TxIn}} = E_{Cpl} + \frac{E_{Tx}E_{Inc}S_{11A}}{1 - E_{Sm}S_{11A}}, \quad (5)$$

$$\rho_{Ref} = \frac{RxRt(f_{In})}{A_{TxIn}} = E_{DRI} + \frac{E_{Tx}E_{Rf}S_{11A}}{1 - E_{Sm}S_{11A}}, \quad (6)$$

where $A_{TxIn}$ represents the known complex value of the input transmitter's Digital-to-Analog Converter (DAC). The unknown error terms in (5) and (6) are determined by measuring SOL standards, thereby yielding results that have the same forms as those in (2)-(4), i.e., $$E_{Cpl} = \rho_{Inc}^L, \quad (7)$$

$$E_{DRI} = \rho_{Ref}^L, \quad (8)$$

$$E_{Sm} = \frac{\rho_{Inc}^S + \rho_{Inc}^O - 2\rho_{Inc}^L}{\rho_{Inc}^O - \rho_{Inc}^S} = \frac{\rho_{Ref}^S + \rho_{Ref}^O - 2\rho_{Ref}^L}{\rho_{Ref}^O - \rho_{Ref}^S}, \quad (9)$$

$$E_{Tx}E_{Inc} = \frac{2(\rho_{Inc}^O - \rho_{Inc}^L)(\rho_{Inc}^S - \rho_{Inc}^L)}{(\rho_{Inc}^S - \rho_{Inc}^O)}, \quad (10)$$

$$E_{Tx}E_{Rf} = \frac{2(\rho_{Ref}^O - \rho_{Ref}^L)(\rho_{Ref}^S - \rho_{Ref}^L)}{(\rho_{Ref}^S - \rho_{Ref}^O)}. \quad (11)$$

Now that the error terms in the signal-flow models have been determined, we define the measured reflection coefficient as $$S_{11M} = \frac{\rho_{Ref}}{\rho_{Inc}}. \quad (12)$$

After substituting (5) and (6) into (12), it can be shown that the actual reflection coefficient can be expressed as $$S_{11A} = \frac{S_{11M}E_{Cpl} - E_{DRI}}{(S_{11M}E_{Cpl} - E_{DRI})E_{Sml} - (S_{11M}E_{Inc} - E_{Rf})E_{Tx}}. \quad (13)$$

2.4.2 Calibration of the Outgoing and incoming Vector Voltages

The transmission coefficients, $T_{Up}$ and $T_{Dn}$, must be known before the other error terms in the third and fourth signal-flow graphs in FIG. 8 can be determined by using measurements on SOL standards. Note that $T_{Up}$ represents the transfer function between the Calibration (Cal) transmitter and point C, and $T_{Dn}$ represents the transfer function between the same point C and the Cal receiver (see FIG. 7). For simplicity, we will assume that these transfer functions are known in this chapter of the patent. In the next chapter we show how the ratio of $T_{Up}/T_{Dn}$ can be measured at the factory.

We now show how the simultaneous measurement of the input and calibration transmitter signals (TxIn and TxC) in the left, calibration, and right receivers (RxLt, RxC, and RxRt) can be used to perform an absolute calibration of the system, i.e., allow us to make absolute measurements of the magnitude and phase of the outgoing and incoming port voltages, i.e., $a_1$ and $A_{Sig1}$, respectively, in FIG. 8. By using the top signal-flow graph in FIG. 8, we find that when the probe is used as a calibrated transmitter with $A_{Sig1}=0$, then the desired output voltage can be represented as $$a_I = A_{TxIn}\frac{E_{Tx}}{1 - S_{11A}E_{Sm}}. \tag{14}$$

Since there may be variations associated with the power amplifier on the input transmitter leg, we will treat the value of $A_{TxIn}$ as an unknown during this analysis since the incident signal monitor provides a measure for this signal. Using (5) we find that $$A_{TxIn} = RxLt(f_{In})\left[E_{Cpl} + \frac{E_{Tx}E_{Inc}S_{11A}}{1 - E_{Sm}S_{11A}}\right]^{-1}. \tag{15}$$

After substituting (15) into (14), we find that the desired outward-traveling port voltage can be measured using $$a_I = RxLt(f_{In})\frac{E_{Tx}}{[(1 - S_{11A}E_{Sm})E_{Cpl} + S_{11A}E_{Tx}E_{Inc}]}, \tag{16}$$

where $E_{Cpl}$, $E_{Sm}$, $E_{Tx}E_{Inc}$, and $S_{11A}$ are given by (7), (9), (10), and (13), respectively. Likewise, when the probe is being used as a calibrated receiver with $A_{TxIn}=0$, then the input voltage can be measured in the left and right receivers by using the top two signal flow graphs in FIG. 8, i.e., $$A_{Sig1} = RxLt(f_{In})\frac{(1 - S_{11A}E_{Sm})}{E_{Inc}} \tag{17}$$

$$A_{Sig1} = RxRt(f_{In})\frac{(1 - S_{11A}E_{Sm})}{E_{Rf}}. \tag{18}$$

Equations (16)-(18) show that in order to correctly measure the outgoing and incoming signals, we must separately determine the error terms $E_{Tx}$, $E_{Inc}$, and $E_{Rf}$. Unfortunately, the previously discussed relative calibration procedure only determines the product of the transmitter and receiver transfer functions, e.g., (10) and (11). A power meter calibration could be used to determine the magnitudes of these individual transfer functions, however, this would only allow for the determination of the magnitudes of the outgoing and incoming signals. In order to overcome this shortfall, we have developed a new AVEC technique wherein we determine both the magnitude and phase of the individual transmission coefficients $E_{Tx}$, $E_{Inc}$, and $E_{Rf}$.

In order to perform the absolute calibration, the input transmitter signal (TxIn) is measured in the left (RxLt) and calibration (RxC) receivers. The third signal-flow graph in FIG. 8 is associated with the measurement of the calibration signal, i.e., $$\rho_{Cal} = \frac{1}{T_{Dn}}\frac{RxC(f_{In})}{A_{TxIn}} = E_{DCI} + \frac{E_{Tx}E_{Cal}S_{11A}}{1 - E_{Sm}S_{11A}}, \tag{19}$$

where $A_{TxIn}$ represents the input amplitude that is measured by the incident signal channel using (15) and $T_{Dn}$ is assumed to be known for now. By measuring the signals that are reflected by the SOL standards, we obtain expressions for the required error term, i.e., $$E_{Tx}E_{Cal} = \frac{2(\rho_{Cal}^O - \rho_{Cal}^L)(\rho_{Cal}^S - \rho_{Cal}^L)}{(\rho_{Cal}^S - \rho_{Cal}^O)}. \tag{20}$$

Note that it is not necessary to measure $E_{DCI}$. Simultaneously, the calibration transmitter signal (TxC) is measured in the right receiver (RxRt) for the SOL standards. The bottom signal-flow graph in FIG. 8 is associated with the measurement of this upward-flowing calibration signal, i.e., $$\rho_{Rt} = \frac{1}{T_{Up}}\frac{RxRt(f_{Cal})}{A_{TxC}} = E_{DRC} + \frac{E_{Cal}E_{Rf}S_{11A}}{1 - E_{Sm}S_{11A}}, \tag{21}$$

where $T_{Up}$ is also assumed to be known during this part of the analysis. Once again, measurements of the SOL calibration standards yield the following expression for the product of the two transmission error terms for this signal-flow graph:

$$E_{Cal}E_{Rf} = \frac{2(\rho_{Rt}^O - \rho_{Rt}^L)(\rho_{Rt}^S - \rho_{Rt}^L)}{(\rho_{Rt}^S - \rho_{Rt}^O)} \tag{22}$$

Since the various signal-flow graphs in FIG. 8 have some common transmission paths, we can combine the results in (11), (20), and (22) in order to solve for each of the transmission coefficients separately, e.g., $$E_{Tx} = \sqrt{\frac{(E_{Tx}E_{Rf})(E_{Tx}E_{Cal})}{(E_{Cal}E_{Rf})}} \tag{23}$$

$$= \sqrt{\frac{2(\rho_{Ref}^O - \rho_{Ref}^L)(\rho_{Ref}^S - \rho_{Ref}^L)(\rho_{Cal}^O - \rho_{Cal}^L)}{(\rho_{Cal}^S - \rho_{Cal}^L)(\rho_{Rt}^S - \rho_{Rt}^O)}{(\rho_{Ref}^S - \rho_{Ref}^O)(\rho_{Cal}^S - \rho_{Cal}^O)(\rho_{Rt}^O - \rho_{Rt}^L)(\rho_{Rt}^S - \rho_{Rt}^L)}}.$$

After substituting (6), (19), and (21) into the above expression we find that $$E_{Tx} = \sqrt{\frac{T_{Up}}{T_{Dn}}}\sqrt{\frac{2A_{TxC}}{A_{TxIn}^2}\frac{\left[\frac{RxRt^O(f_{In})-}{RxRt^L(f_{In})}\right]\left[\frac{RxRt^S(f_{In})-}{RxRt^L(f_{In})}\right]}{\left[\frac{RxRt^S(f_{In})-}{RxRt^O(f_{In})}\right]\left[\frac{RxC^S(f_{In})-}{RxC^O(f_{In})}\right]}} \times \tag{24}$$

$$\sqrt{\frac{\left[\frac{RxC^O(f_{In})-}{RxC^L(f_{In})}\right]\left[\frac{RxC^S(f_{In})-}{RxC^L(f_{In})}\right]\left[\frac{RxRt^S(f_{Cal})-}{RxRt^O(f_{Cal})}\right]}{\left[\frac{RxRt^O(f_{Cal})-}{RxRt^L(f_{Cal})}\right]\left[\frac{RxRt^S(f_{Cal})-}{RxRt^L(f_{Cal})}\right]}},$$

where the expression for $A_{TxIn}$ is given in (15). Expressions for $E_{Inc}$ and $E_{Rf}$ can then be obtained by dividing (10) and (11) by (24).

2.5 Summary of the AVEC Method

Here we briefly summarize the key features of the AVEC Method:

1) Use of four parallel signal flow graphs.
   a) TxIn to RxLt
   b) TxIn to RxRt
   c) TxIn to RxC (reciprocal path)
   d) TxC to RxRt (reciprocal path)
2) All four signal flow graphs have the same source-match errors.
3) The ratio of the receiver and transmitter tracking errors for the reciprocal signal path, which appear in the third and fourth signal flow graphs, can be measured at the factory and is assumed to be known.
4) SOL standards are used to perform a relative calibration, i.e. find the source match, directivity error, and combined transmitter/receiver tracking errors for each of the four signal flow graphs.
5) The four signal flow graphs are combined to separate the transmitter and receiver tracking errors, thereby providing an absolute calibration.

3 Extension of an Absolute Vector Error Correction Technique to Wideband, High-Frequency Measurements

3.1 Introduction

In this chapter, we first show how the AVEC technique can be extended to the vector calibration of a real transmitter/receiver module that employs frequency conversion mixers. In addition, we will also show how a stable Characterized Non-Reciprocal (CNR) mixer ratio can be used to modify the AVEC technique in order to account for the non-reciprocity that is inherent in mixers. As was the case in Chapter 2, it will once again be possible to measure the absolute magnitudes of the test-port signals over the entire bandwidth of the transmitter/receiver module. However, in this chapter, absolute phase we will mean phases that can be compared frequency-to-frequency over specified bandwidths. Since the phase of the Local Oscillator (LO) signal for the frequency up- and down-conversion mixers will affect the phases of the measured incoming and outgoing signals at the test port, it is possible to measure the relative phases over a bandwidth that can be simultaneously digitized by the baseband Analog-to-Digital Converters (ADCs). It is also possible to measure the relative phases between two different Radio Frequency (RF) bands by using two receivers with a common down-conversion LO by measuring different Intermediate Frequencies (IFs) and/or by using different mixer sidebands.

This modified AVEC method allows for the measurement of the incoming and outgoing vector test-port signals on a high-frequency transmitter/receiver module that involves frequency up- and down-conversion mixers. The calibrated module can then be used for the absolute calibration of the new Wideband Absolute Vector Signal (WAVES) Measurement System. The calibrated WAVES Measurement System can then be used for Spectrum Analyzer (SA), Vector Signal Analyzer (VSA), and Vector Network Analyzer (VNA) type measurements.

3.2 Time-Domain Signal-Flow Analysis Assuming Ideal Components

The baseband analysis that was carried out in Chapter 2 was performed in the frequency domain. However, in order to properly account for the effects of the mixers and variable filters, in this chapter we first perform a time-domain analysis of the circuit that is shown in FIG. 4. During this stage of the analysis, we assume that all the components are ideal, e.g., the coupler and the splitters have infinite directivities and return losses, and the mixers are ideal multipliers that only produce signals at the sum and difference frequencies. Once the time-domain analysis has been completed, we then transmit a single tone, select either the upper or lower mixer sideband, and apply the frequency-domain, signal-flow analysis from Chapter 2 to this single tone. The single-tone analysis is then extended to multiple tones in order to provide measurements over a bandwidth that can be simultaneously digitized by the baseband ADCs. Finally, the AVEC technique is used to calibrate a pair of receivers so that vector measurements can be made over a wide bandwidth.

3.2.1 Incident Signal

The circuit in FIG. 4 contains an input transmitter (TxIn) that is used to produce the incident signal, where $|A_{TxIn}|$ and $\alpha_{TxIn}$ denote the amplitude and phase of the tone that is output by the Digital-to-Analog Converter (DAC), and $f_{In}$ denotes the frequency of this tone. As shown in FIG. 4, this signal is then up-converted to a higher frequency by mixing with a swept LO signal. The up-converted signal then passes through either a variable filter (e.g., a YIG-tuned filter), which selects the desired sideband from the mixing process, or a through, before flowing through a resistive splitter, a coupler, and an isolating splitter, before reaching the port-1 output. The filtered outgoing signal that appears at the port-1 output can be represented as $$a_1^{\pm}(t)=|A_{TxIn}T_{Tx}^{\pm}|\cos[2\pi(f_{LO}\pm f_{In})t+\upsilon_{LO}+\phi_{Tx}^{\pm}\pm\alpha_{TxIn}]. \quad (25)$$

The frequencies in the above expression are defined in FIG. 4 and the terms are defined in Table 2. Note that when the variable filter is switched in it will only pass either the sum or difference frequency term, i.e., $a_1^+(t)$ or $a_1^-(t)$, respectively.

Next we find expressions for the associated time-domain signals that are present in the receivers (FIG. 4). For example, during the calibration procedure, a portion of the signal (25) that is reflected by the Short, Open, and matched Load (SOL) calibration standards is coupled into the Cal transmitter/receiver channel. After this signal is frequency down-converted by the mixer, the received baseband signal can be represented as $$RxC^{\pm}(t)=|A_{TxIn}T_{Tx}^{\pm}S_{11A}^{\pm}T_{Cal}^{\pm}T_{Dn}^{\pm}|\cos[2\pi f_{In}t\pm \\ (\phi_{Tx}^{\pm}+\phi_{S11A}^{\pm}+\phi_{Cal}^{\pm}-\delta_{LOC})+\alpha_{TxIn}+\phi_{Dn}^{\pm}]. \quad (26)$$

Note that the time-varying phase associated with the swept LO has dropped out of (26) since the same source is used as the LO for both the up- and down-conversion mixers. However, a static phase difference, $\delta_{LOC}$, which is the LO phase for the Cal mixer that is measured relative to the LO phase for the mixer in the right receiver signal path, is shown explicitly in the above equation since this term will enter into the signal flow analysis differently when the mixer is employed for frequency up- and down-conversion, i.e., as $+\delta_{LOC}$ and $-\delta_{LOC}$ for frequency up- and down-conversion, respectively.

A portion of the signal (25) that is reflected by the DUT will also be coupled into the right receiver channel, $$RxRt^{\pm}(t)=|A_{TxIn}T_{Tx}^{\pm}S_{11A}^{\pm}T_{RxRt}^{\pm}|\cos[2\pi f_{In}t\pm(\phi_{Tx}^{\pm}+ \\ \phi_{S11A}^{\pm}+\phi_{RxRt}^{\pm})+\alpha_{TxIn}]. \quad (27)$$

Likewise, the signal measured in the left receiver can be expressed as $$RxLt^{\pm}(t)=|A_{TxIn}T_{Cpl}^{\pm}T_{RxLt}^{\pm}|\cos[2\pi f_{In}t\pm(\phi_{Cpl}^{\pm}+ \\ \phi_{RxLt}^{\pm})+\alpha_{TxIn}]. \quad (28)$$

Note that in addition to the incident signal, the left receiver will also measure a portion of the signal that reflects off of the SOL standards. We will ignore this signal during this stage of the analysis since it is at least 11 dB smaller than the incident signal. However, the effects of this reflected signal will be accounted for when we carry out the frequency-domain signal-flow analysis in the next section.

3.2.2 Calibration Signal

During the static calibration procedure, the calibration transmitter also transmits a tone at the frequency $f_{Cal}$ at the same time that the input transmitter is transmitting its tone at the frequency $f_{In}$. Therefore, the signal $$RxRt^\pm(t) = |A_{TxC}T_{Up}^\pm T_{Cal}^\pm S_{11A}^\pm T_{RxRt}^\pm| \cos [2\pi f_{Cal}t \pm (\phi_{Cal}^\pm + \phi_{S11A}^\pm + \phi_{RxRt}^\pm + \delta_{LOC}) + \alpha_{TxC} + \phi_{Up}^\pm] \quad (29)$$

will appear in the right receiver along with (27) during the calibration procedure.

3.2.3 Signal Input Into the Test Port

When used as a calibrated receiver, the task will be to accurately measure the RF signal voltage $A_{Sig}$ that is flowing into the 50Ω measurement system. For simplicity, we will first assume that the signal that is input into the test port is a tone, i.e., $$A_{Sig}^\pm(t) = |A_{Sig}^\pm| \cos [2\pi f_{RFSig}^\pm t + \alpha_{Sig}^\pm]. \quad (30)$$

Since this signal will be frequency down-converted by mixing with the LO signal, we rewrite the signal frequency as $$f_{RFSig}^\pm = f_{LO} \pm f_{IFSig}. \quad (31)$$

where the ± indicates whether the upper- or lower-sideband mixing product is used for frequency down-conversion, and $f_{IFSig}$ represents the down-converted, baseband signal frequency. Following the procedure used to obtain (27), we find that the signal that is measured in the right receiver can be expressed as $$RxRt^\pm(t) = |A_{Sig}^\pm T_{RxRt}^\pm| \cos [2\pi f_{IFSig} t \pm (\alpha_{Sig}^\pm + \phi_{RxRt}^\pm - \tau_{LO}^\pm)]. \quad (32)$$

3.3 Absolute Vector Error Correction (AVEC)

In this section, we demonstrate how the previously developed AVEC technique (Chapter 2) is used to provide an absolute calibration of this system.

3.3.1 Frequency-Domain Signal Representations

After the time-domain signals are sampled by an ADC, various signal-processing techniques can be employed to separate the individual tones that make up the signals, e.g., Fast Fourier Transform (FFT) and lock-in analyzer techniques. For example, the time-domain signals in (25) can be represented in the frequency domain as:

$$a_1^\pm(f_{LO} \pm f_{In}) = |A_{TxIn}|T_{Tx}^\pm \exp[j(\tau_{LO} \pm \alpha_{TxIn})] = \underline{A_{TxIn}}T_{Tx}^\pm \exp(j\tau_{LO}), \quad (33)$$

where we will use the under-bar symbol throughout this patent to denote the fact that a complex conjugate is required for the lower-sideband signals, but not for the upper-sideband case, e.g., $$\underline{A_{TxIn}} = \begin{cases} |A_{TxIn}|\exp(j\alpha_{TxIn}); & \text{upper sideband} \\ [|A_{TxIn}|\exp(j\alpha_{TxIn})]^* = |A_{TxIn}|\exp(-j\alpha_{TxIn}); & \text{lower sideband} \end{cases} \quad (34)$$

In a similar manner, the time-domain signals in (26)-(29) and (32) can be represented in the frequency domain as:

$$\underline{RxC^\pm}(f_{In}) = \underline{A_{TxIn}}T_{Tx}^\pm S_{11A}^\pm T_{Cal}^\pm T_{DN}^\pm \exp(-j\delta_{LOC}), \quad (35)$$

$$\underline{RxRt^\pm}(f_{In}) = \underline{A_{TxIn}}T_{Tx}^\pm S_{11A}^\pm T_{RxRt}^\pm, \quad (36)$$

$$\underline{RxLt^\pm}(f_{In}) = \underline{A_{TxIn}}T_{Cpl}^\pm T_{RxLt}^\pm, \quad (37)$$

$$\underline{RxRt^\pm}(f_{Cal}) \pm A_{TxC}T_{Up}^\pm T_{Cal}^\pm S_{11A}^\pm T_{RxRt}^\pm \exp(j\delta_{LOC}), \quad (38)$$

$$\underline{RxRt^\pm}(f_{IFSig}) = \underline{A_{Sig}^\pm} T_{RxRt}^\pm \exp(-j\tau_{LO}). \quad (39)$$

3.3.2 Calibration of the Relative Reflection Coefficient

In order to calibrate the system for relative reflection coefficient measurements, the input transmitter (TxIn) signal is measured in the left (RxLt) and right (RxRt) receivers. In order to extend the AVEC procedure that is discussed in Chapter 2, we first define the incident signal as $$\rho_{Inc}^\pm = \frac{\underline{RxLt^\pm}(f_{In})}{\underline{A_{TxIn}}} = T_{Cpl}^\pm T_{RxLt}^\pm = E_{Cpl}^\pm, \quad (40)$$

where $A_{TxIn}$ represents the known setting on the input Digital-to-Analog Converter (DAC). Recall that we assumed that the components were ideal when deriving (37). In order to extend this analysis to non-ideal components (e.g., a coupler and splitters with finite directivity), we employ the top signal-flow graph in FIG. 9, thereby yielding $$\rho_{Inc}^\pm = E_{Cpl}^\pm + \frac{E_{Tx}^\pm E_{Inc}^\pm S_{11A}^\pm}{1 - E_{Sm}^\pm S_{11A}^\pm}. \quad (41)$$

Figure 9:
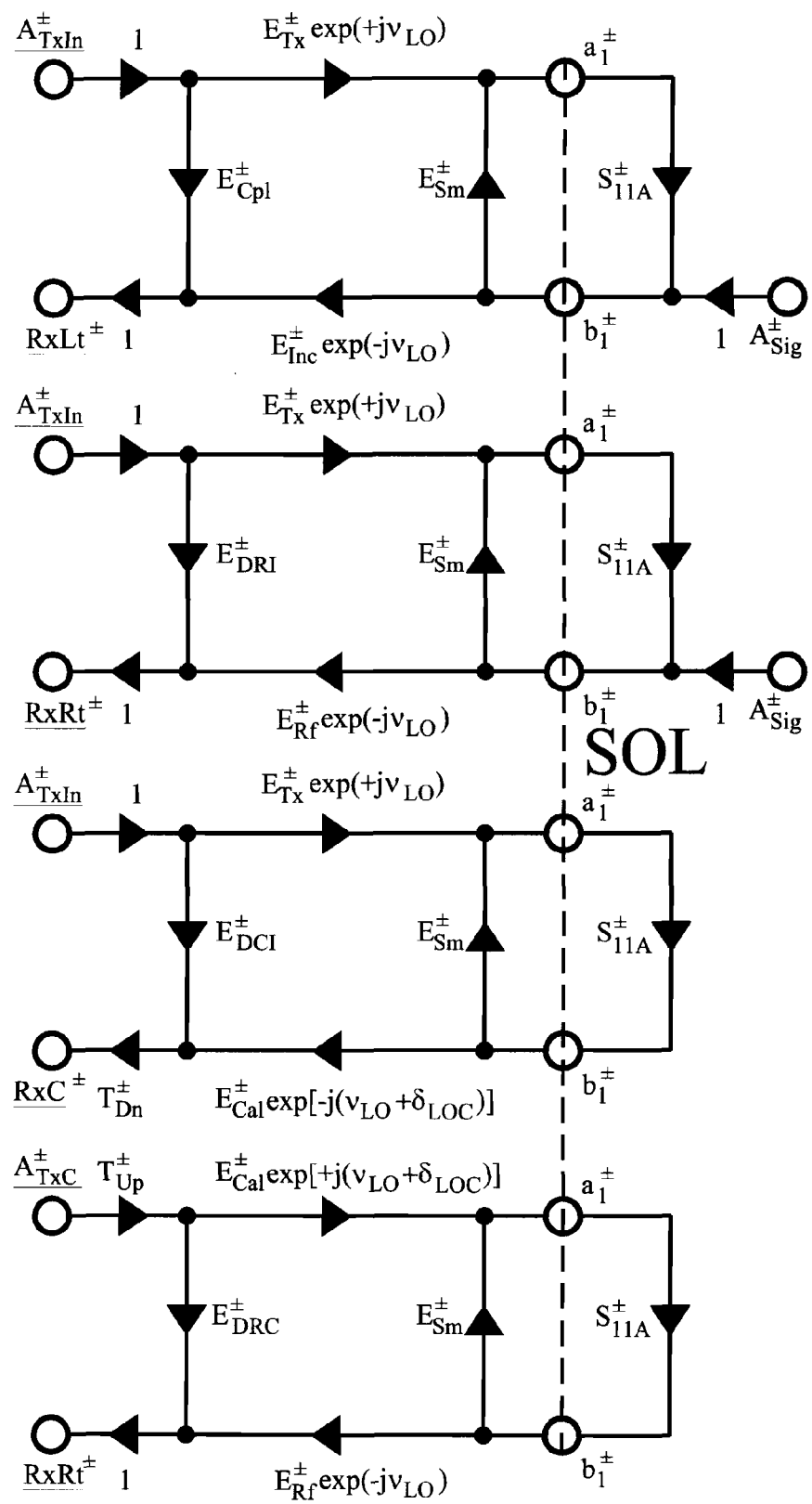
FIG. 9 shows the port-1 signal flow graphs for the AVEC method with terms that account, for the unknown phase of the LO for the frequency up- and down-conversion mixers with a preferred embodiment of the present invention.

Note that the terms $\exp(\pm j v_{LO})$ in FIG. 9 represent the phases associated with the LOs of the mixers for up-conversion and down-conversion. While these LO phase effects cancel in (41), they will become important when trying to determine the phases of the outgoing and input signals, i.e., $a_1^\pm$ and $A_{Sig1}$, respectively. The error coefficients in (41) can be determined by making measurements on SOL standards, i.e., see (7)-(9), and $$E_{Tx}^\pm E_{Inc}^\pm = \frac{2(\rho_{Inc}^{\pm O} - \rho_{Inc}^{\pm L})(\rho_{Inc}^{\pm S} - \rho_{Inc}^{\pm L})}{(\rho_{Inc}^{\pm S} - \rho_{Inc}^{\pm O})}. \quad (42)$$

A similar procedure can be applied to the measured reflected signal, i.e., $$\rho_{Ref}^\pm = \frac{\underline{RxRt^\pm}(f_{IF})}{\underline{A_{TxIn}}} = T_{Tx}^\pm S_{11A}^\pm T_{RxRt}^\pm = E_{Tx}^\pm S_{11A}^\pm E_{Rf}^\pm. \quad (43)$$

The limitations imposed by assuming ideal components can once again be overcome by using the second signal-flow graph in FIG. 9, thereby yielding $$\rho_{Ref}^\pm = E_{DRI}^\pm + \frac{E_{Tx}^\pm E_{Rf}^\pm S_{11A}^\pm}{1 - E_{Sm}^\pm S_{11A}^\pm}, \quad (44)$$

where expressions for the error terms are given in (8) and (9), and $$E_{Tx}^\pm E_{Rf}^\pm = \frac{2(\rho_{Ref}^{\pm O} - \rho_{Ref}^{\pm L})(\rho_{Ref}^{\pm S} - \rho_{Ref}^{\pm L})}{(\rho_{Ref}^{\pm S} - \rho_{Ref}^{\pm O})}. \quad (45)$$

If we define the measured reflection coefficient as $$S_{11M}^{\pm} = \frac{\rho_{ref}^{\pm}}{\rho_{Inc}^{\pm}}, \quad (46)$$

then the actual reflection coefficient can be computed using $$S_{11A}^{\pm} = \frac{S_{11M}^{\pm} E_{Cpl}^{\pm} - E_{DRl}^{\pm}}{(S_{11M}^{\pm} E_{Cpl}^{\pm} - E_{DRl}^{\pm})E_{Sm}^{\pm} - (S_{11M}^{\pm} E_{Inc}^{\pm} - E_{Rf}^{\pm})E_{Tx}^{\pm}}. \quad (47)$$

3.3.3 Measurement of the Outgoing and incoming Vector Voltages

When using the module as a transmitter, (6), (33), and (43) can be used to show that for the special case of ideal components, the outgoing vector voltage can be represented as $$a_1^{\pm}(f_{LO} \pm f_{In}) = \underline{A_{TxIn}} E_{Tx}^{\pm} \exp(j\tau_{LO}), \quad (48)$$

where the incident signal level can be monitored using the left receiver $$\underline{A_{TxIn}} = \frac{RxLt^{\pm}(f_{In})}{E_{Cpl}^{\pm}}. \quad (49)$$

In order to account for the finite directivity coupler and splitter, we employ the top signal-flow graph in FIG. 9 to show that $$\underline{A_{TxIn}} = RxLt^{\pm}(f_{In}) \left( E_{Cpl}^{\pm} + \frac{E_{Tx}^{\pm} E_{Inc}^{\pm} S_{11A}^{\pm}}{1 - E_{Sm}^{\pm} S_{11A}^{\pm}} \right)^{-1} \quad (50)$$

$$a_1^{\pm}(f_{LO} \pm f_{In}) = \underline{A_{TxIn}} \frac{E_{Tx}^{\pm} \exp(jv_{LO})}{1 - S_{11A}^{\pm} E_{Sm}^{\pm}} = \frac{RxLt^{\pm}(f_{In})E_{Tx}^{\pm} \exp(jv_{LO})}{[(1 - S_{11A}^{\pm} E_{Sm}^{\pm}) + S_{11A}^{\pm} E_{Tx}^{\pm} E_{Inc}^{\pm}]}. \quad (51)$$

In a similar manner, reference to (39) and (43) shows that the incoming test-port signal can be measured in the right receiver by using $$A_{Sig}^{\pm} = \frac{RxRt^{\pm}(f_{IFSig})\exp(jv_{LO})}{E_{Rf}^{\pm}}. \quad (52)$$

Therefore, when using the module as a calibrated receiver with $A_{TxIn} = 0$, $A_{Sig}^{\pm}$ can be measured in the left and right receivers by using the top two signal flow graphs in FIG. 9, i.e., $$A_{Sig}^{\pm} = \underline{RxLt^{\pm}}(f_{IFSig}) \frac{(1 - S_{11A}^{\pm} E_{Sm}^{\pm})}{E_{Inc}^{\pm} \exp(-jv_{LO})}, \quad (53)$$

$$A_{Sig}^{\pm} = \underline{RxRt^{\pm}}(f_{IFSig}) \frac{(1 - S_{11A}^{\pm} E_{Sm}^{\pm})}{E_{Rf}^{\pm} \exp(-jv_{LO})}. \quad (54)$$

3.3.4 Calibration of the Outgoing and Incoming Vector Voltages

The transmission coefficients, $T_{Up}^{\pm}$ and $T_{Dn}^{\pm}$ in FIG. 9, must be characterized at the factory before the other error terms in the third and fourth signal-flow graphs in FIG. 9 can be determined by using measurements on SOL standards. However, for simplicity, we will assume that these transfer functions are known during this stage of the analysis. Following the development of the absolute calibration equations in this section, we will then show how the ratio of $\sqrt{T_{Up}^{\pm}/T_{Dn}^{\pm}}$ can be measured at the factory. Note that $T_{Up}^{\pm}$ represents the transfer function between the Calibration (Cal) transmitter and point C, and $T_{Dn}^{\pm}$ represents the transfer function between the same point C and the Cal receiver (see FIG. 4). Also note that these terms will be used to account for the stable non-reciprocity errors associated with the calibration mixer and any errors in the Cal DAC and Cal ADC, respectively.

As discussed in Chapter 2, in order to calculate (51), (53), and (54), we must first find expressions for $E_{Tx}^{\pm}$, $E_{Inc}^{\pm}$, and $E_{Rf}^{\pm}$, respectively. This is accomplished by making simultaneous measurements of the signals that flow up and down through a quasi-reciprocal calibration (Cal) signal-flow path (see FIG. 9). With both the input and calibration transmitters turned on, the downward-flowing signal is measured in the Cal receiver and modeled by the third signal-flow graph in FIG. 9, i.e., $$\rho_{Cal}^{\pm} = \frac{RxC^{\pm}(f_{IF})}{\underline{A_{TxIn}} T_{DN}^{\pm}} = E_{DCl}^{\pm} + \frac{E_{Tx}^{\pm} E_{Cal}^{\pm} S_{11A}^{\pm} \exp(-j\delta_{LOC})}{1 - E_{Sm}^{\pm} S_{11A}^{\pm}}, \quad (55)$$

where $A_{TxIn}$ is given by (50) and $T_{Dn}^{\pm}$ models both the baseband portion of the Cal receiver and the non-reciprocity in the Cal mixer. At the same time, the normalized calibration signal is measured in the right receiver and is modeled by the bottom signal-flow graph in FIG. 9, i.e., $$\rho_{Rt}^{\pm} = \frac{RxRt^{\pm}(f_{IF})}{\underline{A_{TxC}} T_{Up}^{\pm}} = E_{DRC}^{\pm} + \frac{E_{Cal}^{\pm} E_{Rf}^{\pm} S_{11A}^{\pm} \exp(+j\delta_{LOC})}{1 - E_{Sm}^{\pm} S_{11A}^{\pm}}. \quad (56)$$

where $T_{Up}^{\pm}$ models both the baseband portion of the Cal transmitter and the non-reciprocity in the Cal mixer. The measurements on the SOL standards are also used to determine the error terms in (55) and (56), where the tracking errors appear slightly differently from those in Chapter 2 because of the added phase terms that appear in (55) and (56), i.e., $$E_{Tx}^{\pm} E_{Cal}^{\pm} = \frac{2(\rho_{Cal}^{\pm O} - \rho_{Cal}^{\pm L})(\rho_{Cal}^{\pm S} - \rho_{Cal}^{\pm L})}{(\rho_{Cal}^{\pm S} - \rho_{Cal}^{\pm O})} \exp(+j\delta_{LOC}), \quad (57)$$

$$E_{Cal}^{\pm} E_{Rf}^{\pm} = \frac{2(\rho_{Rt}^{\pm O} - \rho_{Rt}^{\pm L})(\rho_{Rt}^{\pm S} - \rho_{Rt}^{\pm L})}{(\rho_{Rt}^{\pm S} - \rho_{Rt}^{\pm O})} \exp(-j\delta_{LOC}). \quad (58)$$

Following the procedure outlined in Chapter 2, we combine the results in (45), (57), and (58) in order to show that the input transmitter's transmission coefficient can be expressed as $$E_{Tx}^{\pm} = \exp(+j\delta_{LOC}) \sqrt{\frac{2(\rho_{Ref}^{\pm O} - \rho_{Ref}^{\pm L})(\rho_{Ref}^{\pm S} - \rho_{Ref}^{\pm L})(\rho_{Cal}^{\pm O} - \rho_{Cal}^{\pm L})}{(\rho_{Cal}^{\pm S} - \rho_{Cal}^{\pm L})(\rho_{Ref}^{\pm S} - \rho_{Ref}^{\pm O})}} \cdot \quad (59)$$

After substituting (44), (55), and (56) into the above equation, we find that $$E_{Tx}^{\pm} = \tag{60}$$

$$\exp(+j\delta_{LOC})\sqrt{\frac{T_{Up}^{\pm}}{T_{Dn}^{\pm}}} \sqrt{\frac{2A_{TxC}\left[\frac{RxRt^{\pm O}(f_{In})-}{RxRt^{\pm L}(f_{In})}\right]\left[\frac{RxRt^{\pm S}(f_{In})-}{RxRt^{\pm L}(f_{In})}\right]}{A_{TxIn}^2\left[\frac{RxRt^{\pm S}(f_{In})-}{RxRt^{\pm O}(f_{In})}\right]\left[\frac{RxC^{\pm S}(f_{In})-}{RxC^{\pm O}(f_{In})}\right]}} \times$$

$$\sqrt{\frac{\left[\frac{RxC^{\pm O}(f_{In})-}{RxC^{\pm L}(f_{In})}\right]\left[\frac{RxC^{\pm S}(f_{In})-}{RxC^{\pm L}(f_{In})}\right]\left[\frac{RxRt^{\pm S}(f_{Cal})-}{RxRt^{\pm O}(f_{Cal})}\right]}{\left[\frac{RxRt^{\pm O}(f_{Cal})-}{RxRt^{\pm L}(f_{Cal})}\right]\left[\frac{RxRt^{\pm S}(f_{Cal})-}{RxRt^{\pm L}(f_{Cal})}\right]}},$$

where $A_{TxIn}$ is given in (50) and $A_{TxC}$ represents the complex amplitude setting of the calibration DAC. The outgoing and incoming vector voltages at the test port can be calibrated and measured by following the steps outlined in II-B in the Appendix.

3.3.5 Factory Calibration of the Transmission Coefficient Ratio $\sqrt{T_{Up}^{\pm}/T_{Dn}^{\pm}}$ The terms $T_{Up}^{\pm}$ and $T_{Dn}^{\pm}$ model transmission paths for fixed, low-frequency signals (e.g., <485 MHz) in this high-frequency application (see FIG. 4). When deriving the result in (60), it was assumed that the transmission coefficient in the Cal signal flow path (i.e., $E_{Cal}^{\pm}$) is the same for both up-conversion and down-conversion. Therefore, any non-reciprocity in the calibration mixer will be modeled using the terms $T_{Up}^{\pm}$ and $T_{Dn}^{\pm}$ (see FIG. 9). The potentially unstable high-order filters in the switched filter bank and the variable gain-ranging amplifier are calibrated during a separate step in the calibration procedure as is discussed below.

References to (43), (55), and (56) shows that while $\rho_{Inc}^{\pm}$ and $\rho_{Ref}^{\pm}$ don't depend on either of these terms, the following two terms do: $\rho_{Cal}^{\pm} \propto (T_{Dn}^{\pm})^{-1}$ and $\rho_{Rt}^{\pm} \propto (T_{Up}^{\pm})^{-1}$. Therefore, when these terms were substituted into (59) to obtain (60) we found that $$E_{Tx}^{\pm} \propto \sqrt{T_{Up}^{\pm}/T_{Dn}^{\pm}}. \tag{61}$$

It is important that the terms $T_{Up}^{\pm}$ and $T_{Dn}^{\pm}$ only appear as a ratio in (60) since the non-reciprocity in the calibration mixer is characterized occasionally at the factory and thereafter this ratio is treated as a known quantity. We have found that even though a mixer's conversion loss changes as the time and temperature change, the ratio of the conversion losses for the up-converted and down-converted signals is very insensitive to changes in these parameters. Therefore, the ratio in (61) can be measured and then treated as a known quantity, thus allowing for the accurate calculation of the error terms $E_{Tx}^{\pm}$, $E_{Inc}^{\pm}$, and $E_{Rf}^{\pm}$, as well as the outgoing (51) and incoming (53) and (54) voltages. Note that the other terms in (51), (53), and (54) do not involve either of the transmission coefficients $T_{Up}^{\pm}$ or $T_{Dn}^{\pm}$.

The procedure for measuring the ratio $\sqrt{T_{Up}^{\pm}/T_{Dn}^{\pm}}$ at the factory is outlined in the steps in item I-A in the Appendix. Once this ratio has been computed and stored, then it can be used to make future vector calibrated measurements of the inward and outward traveling vector voltages.

3.3.6 More Frequent Calibration of the $\sqrt{T_{Up}^{\pm}/T_{Dn}^{\pm}}$ Ratio

As is discussed later, a bank of switched, high-order, IF band-pass filters is required in order to use a Nyquist-band ADC for high-dynamic-range measurements. Since the responses of high-order filters can drift with changes in temperature, these filters must be calibrated more often. Furthermore, the variable gain ranging amplifier must also be recalibrated when its setting is changed. This is accomplished by following the steps listed under items I-B and II-A in the Appendix.

3.4 Extension of the AVEC Technique to Measurements Over the YIG Filter Bandwidth During the previous analysis, we assumed that the DACs output single tones, i.e., see TxIn and TxC in FIG. 9. However, if the DACs output a series of tones, e.g., $$A_{TxIn}(t) = \sum_{\tau=1}^{T} |A_{TxIn(\tau)}|\cos(2\pi f_{InI(\tau)}t + \alpha_{TxIn(\tau)}), \tag{62}$$

then the AVEC technique can be extended so that the calibration is valid over the bandwidth of the YIG filters in the receivers (e.g., 36 MHz). For this case, the YIG filter is switched into the input transmitter path (see FIG. 4) and the YIG filters in both the left and right receiver channels are set to pass the same RF frequencies. After the transmitted multi-tone signals are received and digitized by the receiver ADCs, a Fast Fourier Transform (FFT) can be used to separate out the individual tones at discrete frequencies. Next, the previously described AVEC technique can be used to calibrate the system response at these discrete frequencies. Then a fitting algorithm (e.g., least-squares polynomial fit) can be used to interpolate the error coefficients over the YIG filter bandwidth. Finally, the interpolated error coefficients can be used together with (51), (53), and (54) to accurately measure the vector outgoing and incoming signals at the test port provided that there are a sufficient number of tones that are properly placed over the YIG filter bandwidth. Since all of the signals within the YIG filter bandwidth are simultaneously downconverted with a common LO and then digitized by the ADCs, the relative phases can be compared between the various measured signals within the YIG filter bandwidth. Furthermore, the unknown term $\exp(+j\delta_{LOC})$ in (60) is common to all signals in the measured band so it can be ignored when making relative phase measurements.

3.5 Extension of the AVEC Technique to Measurements of an Input Signal Over a Wide Bandwidth It is also possible to make wideband relative phase measurements of periodic, modulated signals provided that the same LO is employed for the up-conversion transmitter and two or more down-conversion receivers, and different Radio Frequencies (RFs) and Intermediate Frequencies (IFs) are employed in the receivers (see FIG. 4). When calibrating the system for this measurement configuration, the YIG filter is switched out of the input transmitter path. This new wideband technique is based on the fundamental mixer equation $$f_{RFp}^{\pm} = f_{LO} \pm f_{IFp}, \tag{63}$$

where $p=\alpha, \beta$ identifies the receiver, the $\pm$ indicates whether the upper (+) or lower (−) sideband is utilized from the mixing process, and $f_{IF}$ can denote either the input transmitter frequency $f_{In}$ or the calibration transmitter frequency $f_{Cal}$. Note that $p=\alpha$ and $p=\beta$ can identify the left and right receivers on one port (as in this Chapter), or these variables can also represent the receivers on the port-2 and port-3 probes in a mixer characterization system. The key is that phase measurements that are made in one receiver over one frequency band can be related to the phase measurements that are made simultaneously in a second receiver over a different frequency band since the unknown high-frequency LO phase is common to both sets of measurements.

By varying the LO frequency, the IF frequencies for the two receivers, and the mixer sideband that is used in each receiver, it is possible to hold the RF frequency for the reference receiver fixed ($f_{RF\alpha}$) while sequentially varying the RF frequency of the second offset receiver ($f_{RF\beta}$). The RF frequencies, and the corresponding sidebands that are employed by the two receivers, are selected via the variable YIG filters in the receivers as shown in FIG. 4. In order to maximize the dynamic range and minimize the amount of data that must be collected by the ADCs and stored in memory, we have chosen to design the system around high resolution (e.g., 16 bit), 200 MSa/S Nyquist-band ADCs. The variable IF frequencies for the two receivers are selected by switching in various fixed high-order band-pass filters, as shown in Table 3, thus selecting the desired Nyquist band and avoiding aliasing. Note that it is also possible to employ variable IF filters if they have adequate selection, or wideband ADCs (e.g., 1.2 MSa/S), thereby eliminating the need for variable filters.

Table 4 demonstrates the new wideband vector measurement technique. Graphical depictions of how the frequencies in Table 4 are related are given in FIGS. 2 and 3. When creating Table 4, we assumed that the left receiver (p=α) is being used as a reference receiver to measure signals over a 36 MHz YIG filter bandwidth with a fixed center frequency at $f_{RF\alpha}$=5000 MHz (see column 1). The LO frequency ($f_{LO}$). IF frequencies ($f_{IF\alpha}$ and $f_{IF\beta}$), and the mixing sidebands (SBα and SBβ) for the left and right receivers are then adjusted according to (63) in such a way (columns 2-3, and 4-6 or 8-10) that the RF frequencies measured in the second receiver ($f_{RF\beta}$) are frequency offset (column 12) below or above (column 7 or 11) the reference frequency band, respectively. Note that using a 36 MHz bandwidth leads to a small overlap of the measurement bands.

Table 4 was created as follows. We first choose the reference frequency, e.g., $f_{RF\alpha}$=5000 MHz (column 1). For frequency offsets that are less than 252 MHz, we employ the same mixer sidebands for the two receivers, i.e., SBα=SBβ=−1 when $f_{RF\beta}$<$f_{RF\alpha}$, or SBα=SBβ=+1 when $f_{RF\beta}$>$f_{RF\alpha}$ (see FIG. 2a and rows 1-8 in Table 4). However, for frequency offsets that are greater than 252 MHz, we employ different mixer sidebands for the two receivers, i.e., −SBα=SBβ=−1 when $f_{RF\beta}$<$f_{RF\alpha}$, or −SBα=SBβ+1 when $f_{RF\beta}$>$f_{RF\alpha}$ (see FIG. 2b and rows 9-29 in Table 4). The LO frequency is then related to the reference RF and IF frequencies ($f_{RF\alpha}$ and $f_{IF\alpha}$) by (63), i.e., $$f_{LO} = f_{RF\alpha}^{SB\alpha} - SB\alpha g f_{IF\alpha}. \qquad (64)$$

Two IF frequencies (Table 4, column 2) within each IF filter bandwidth in Table 3 are then chosen and used to calculate the LO frequencies for the two cases (Table 4, columns 4 and 8). The offset frequencies $f_{RF\beta}$ are then computed for the two cases (columns 7 and 11) using $$f_{RF\beta}^{SB\beta} = f_{LO} + SB\beta g f_{IF\beta}, \qquad (65)$$

where we once again choose two IF frequencies for the offset receiver (column 3) that lie within the filter bandwidths in Table 3.

Since we have designed the system around 200 MSa/S Nyquist band ADCs, we must filter the IF signals in order to avoid the aliasing that will occur near the Nyquist band edges (see columns 2 and 3 in Table 3), i.e., at integer multiples of 100 MHz. This can be accomplished using fixed filters whose bandwidths are ⅔ of the Nyquist frequency (i.e., ≈66 MHz). We will employ 36 MHz of the YIG bandwidth (which allows for some overlap between the measurements), and allow for two offset measurement within each of the Nyquist band filters listed in Table 3 (see columns 2 and 3 in Table 4). By using combinations of $f_{IF\alpha}$ and $f_{IF\beta}$, we can then cover a 100 MHz RF bandwidth by making three consecutive measurements (i.e., the rows are divided into sets of 3 in Table 4).

Table 4 can be used as follows. First determine the offset frequency between the reference and measurement frequency bands. After finding the row that most closely corresponds to the desired offset frequency in column 12, the IF frequencies for the two receivers are found by looking at the values that appear in the same row in columns 2 and 3. Columns 5-6, and 9-10 are then used to determine the mixer sideband that is used for each receiver. Finally, (64) is used to determine the LO frequency, i.e., columns 4 and 8.

When calibrating the probe or using it as a wideband, multi-tone transmitter, the YIG filter is switched out of the input transmitter path (see FIG. 4). If the wideband (e.g., 1200 MSa/S clock) Input and Cal Transmitter DACs produce sets of tones over a 36 MHz bandwidth about the IF center frequencies $f_{IF\alpha}$ and $f_{IF\beta}$, then the upconversion mixer will produce tones centered about the desired frequencies $f_{RF\alpha}$ and $f_{RF\beta}$. Note that additional tones will be produced at the unused sidebands, but these tones will be filtered by the YIG filters on the receivers. After setting the receiver YIG filters to the desired frequencies, the previously discussed AVEC technique can be used to calibrate the system. Relative phase calibration between the two receiver bands is possible since the transmitter DAC and the receiver ADCs are triggered. Furthermore, the unknown term exp(+j$\delta_{LOC}$) in (60) is common to all signals in both receiver bands, so it can once again be ignored when making relative phase measurements. Wideband vector data can be collected by changing the YIG center frequency in the second receiver, recalibrating the system, and then collecting a new set of data (see II-C in the Appendix).

Wideband vector signal measurements of a user's input signal can also be made provided that the signal, is a periodic, modulated signal that is triggered at baseband. For example, vector signal generators use triggered DACs to produce a baseband signal. This baseband signal is then frequency upconverted by modulating a high frequency carrier (i.e., LO). Our wideband receiver can be used to measure such signals since the effects of the vector signal generators LO will drop out when making simultaneous, relative phase measurement with the two receivers. Furthermore, a repeatable reference can be measured by using the baseband trigger output from the vector signal generator to trigger the receiver ADCs.

4. New Technique for Vector Mixer Characterization

In this Chapter we show how the AVEC technique can be used for the vector characterization of MUTs. Unlike the previously discussed static error correction techniques that only allow for relative mixer measurements or absolute power measurements, this new AVEC technique allows for the accurate measurement of both the absolute magnitude and relative phases of the signals at the input ports of MUTs.

Figure 10:
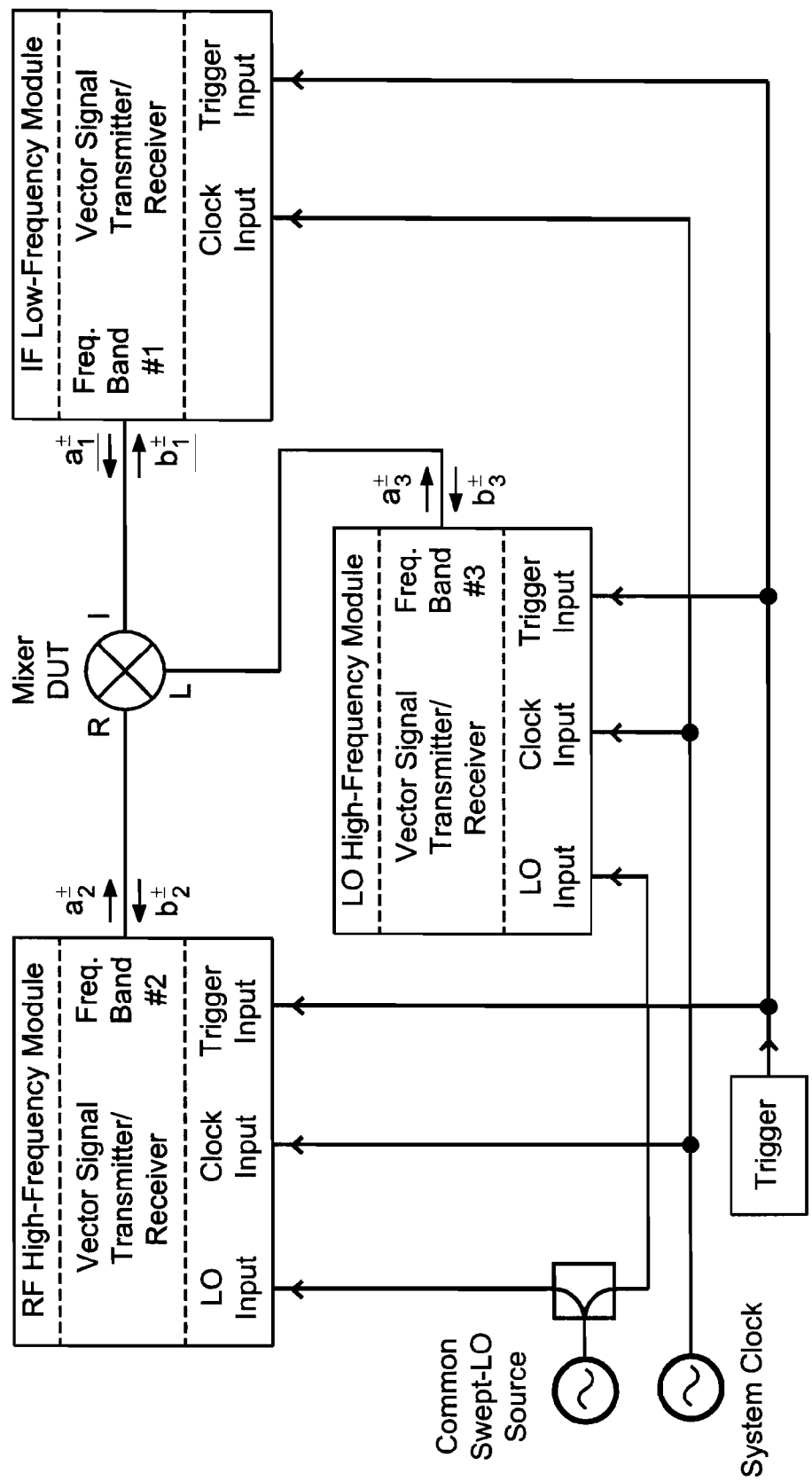
FIG. 10 shows the setup for making vector mixer measurements with a preferred embodiment of the present invention.
Figure 11:
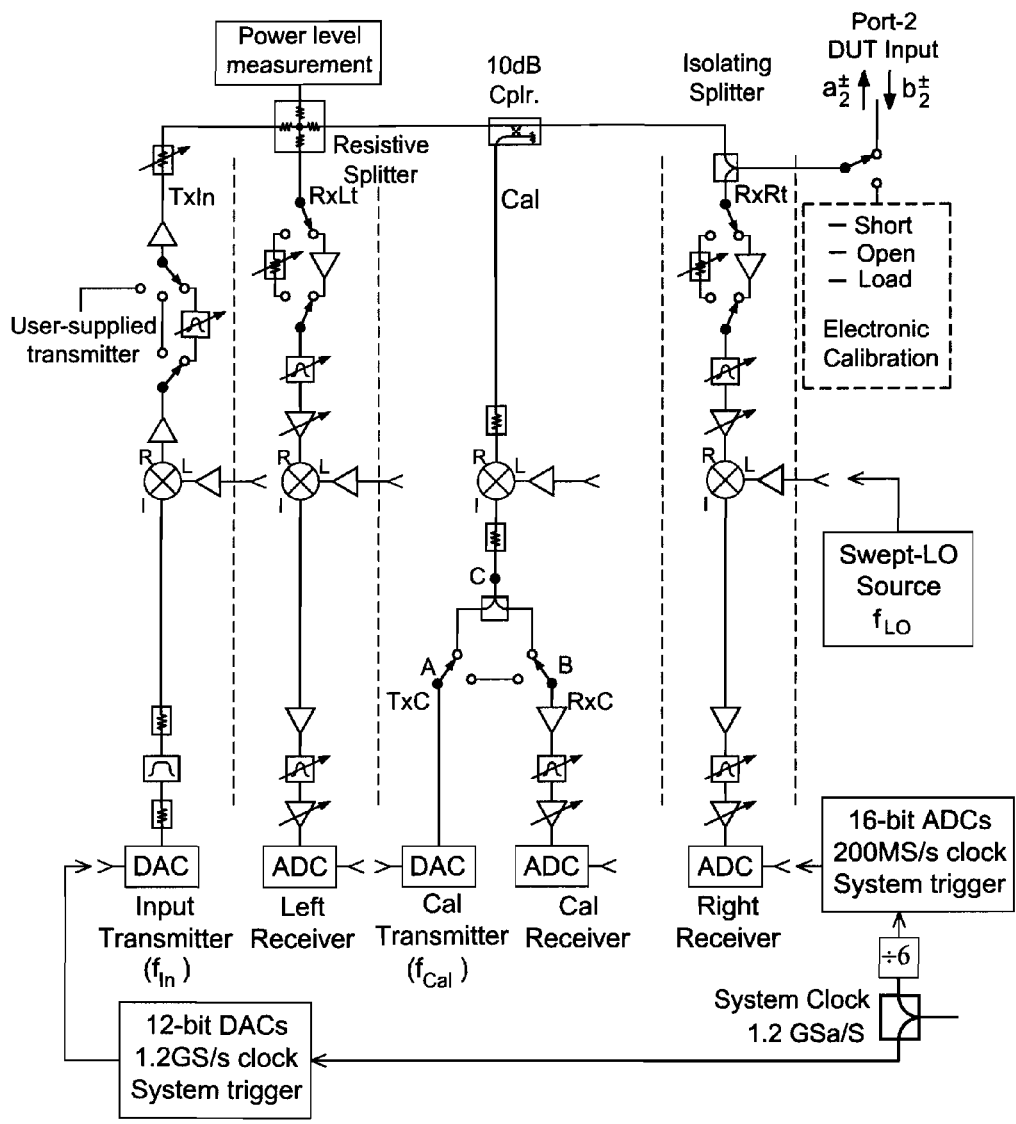
FIG. 11 shows the high-frequency (0.5-20 GHz) transmitter/receiver module that is connected to the RF port, on the MUX with a preferred embodiment of the present invention.
Figure 12:
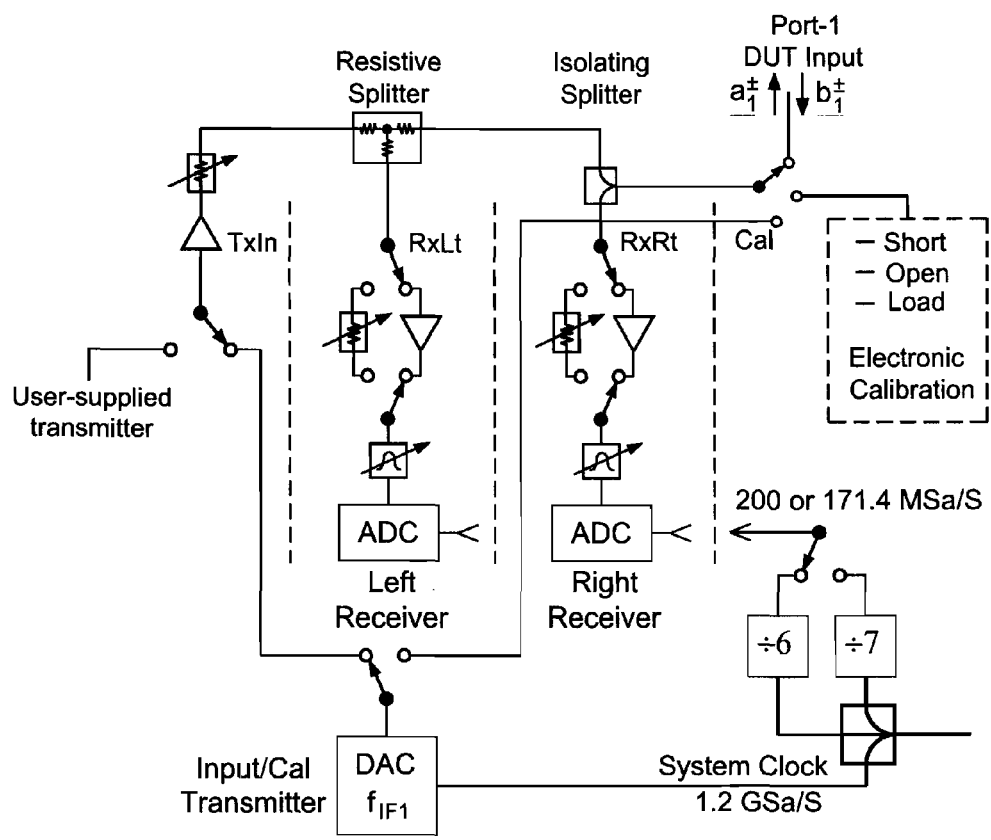
FIG. 12 shows the low-frequency (1-500 MHz) transmitter/receiver module that is connected to the IF port on the MUT with a preferred embodiment of the present invention.

Mixers are typically employed to either frequency up-convert or down-convert a signal. When used as such, two of the mixer's ports (i.e., the RF and LO ports) are high-frequency ports, and the remaining IF port is used at a much lower frequency. The fundamental equation that describes the relationship between the frequencies on the three ports of a MUT is $$f_{RFD}^{\pm} = f_{LOD} \pm f_{IFD}, \qquad (66)$$

where the ± indicates whether the upper (+) or lower (−) sideband is utilized from the mixing process, and the D in the subscripts indicates that these are the frequencies for the DUT instead of the frequencies in the measurement system. In this Chapter, we will assume that $0.5\text{ GHz} \leq f_{RFD}^{\pm}$, $f_{LOD} \leq 20\text{ GHz}$ and $f_{IFD} \leq 0.5\text{ GHz}$. As shown in FIG. 10, we will connect two high-frequency modules (see FIG. 11), which are similar to the module shown in FIG. 4, to the RF and LO ports. As demonstrated in Chapter 3, the use of a common system LO for frequency up- and down-conversion in these two high-frequency modules will allow for relative phase measurements between these two ports. A low-frequency measurement module (FIG. 12) is used to make vector measurements on the IF mixer port.

4.1 High-frequency Modules Connected to the RF and LO Ports

In order to allow for measurements over a wider frequency range, in this Chapter we have designed the high-frequency modules (FIG. 11) with two switched YIG-tuned filters instead of one, i.e., the first filter has a 0.5-2 GHz tuning range and a 22 MHz bandwidth, and the second filter has a 2-20 GHz tuning range and a 36 MHz bandwidth. Table 4 is employed when both frequencies $f_{RF\alpha} = f_{LOD}$ and $f_{RF\beta} = f_{RFD}$ are in the range 2-20 GHz. Note that we have assumed that the LO frequency is used as the reference frequency in this case. In a similar manner, Table 5 illustrates how wideband relative phase measurements can be made when either $f_{RF\alpha} = f_{LOD}$ or $f_{RF\beta} = f_{RFD}$ are within the lower-frequency (0.5-2) GHz range, and the other frequency is within the 0.5-20 GHz range. The method that is outlined in Table 5 is employed when one signal is within the 0.5-2 GHz range and the other frequency is within the 2-20 GHz range since the measurements are limited by the 22 MHz bandwidth of the 0.5-2 GHz YIG filter. As is the case in Chapter 3, here we assume that the baseband signals are digitized using 200 MSa/S Nyquist-band ADCs. The switched filter bank that is described in columns 1-5 in Table 6 is used to avoid aliasing when switching between the various Nyquist bands. Since the 0.5-2 GHz YIG-tuned filter has a smaller bandwidth than the 2-20 GHz YIG-tuned filter (i.e., 22 MHz versus 36 MHz), more measurements are required to fill up each Nyquist band (i.e., 5 versus 3).

4.2 Low-Frequency Module Connected to the IF Port

The low-frequency measurement module (FIG. 12) doesn't employ up- or down-conversion mixers. Instead, a DAC is used directly to create the transmitter signal and Nyquist-band ADCs directly measure the incident, reflected, and input signals. Here we have assumed that the DAC is synchronized by a 1.2 GSa/S clock. Therefore, the DAC can directly output signals over a 1-500 MHz range. The Nyquist-band ADCs are clocked using either a 1.2 GSa/S÷6=200 MSa/S or a 1.2 GSa/S÷7≈171.4 MSa/S clock input, thereby allowing for sequential banded measurements over the entire 500 MHz input bandwidth. For example, FIG. 13 and Table 6 show that the first Nyquist band is used to make measurements from 0-93 MHz when using the 200 MSa/S clock frequency. Switching the input filter and the clock frequency to 171.4 MSa/S then allows the ADCs to measure input frequencies in the range 90-120 MHz by using the second Nyquist band. Use of the second Nyquist band together with the 200 MSa/S clock frequency then allows for measurements over the 116-184 MHz range, etc. Here we have designed the filter cutoff frequencies for the 171.4 MSa/S clock case in such a way that there is some overlap between the passbands for the 200 MSa/S and 171.4 MSa/S clock cases.

4.3 Characterization of Down-Conversion MUTs

When measuring a MUT in the down-conversion mode, transmitters are required on both the RF and LO ports. In order to simplify the mathematical analysis so that this new technique can be better understood, we will follow the method that was used in Chapter 3, where we first assumed that there are single tones and that all the components in the probes are ideal, e.g., the couplers and splitters have infinite directivity and return loss and the mixers are ideal multipliers that only produce signals at the sum and difference frequencies. Once the time-domain analysis has been completed, we can then directly apply the AVEC technique (Chapter 2) to handle the complexities associated with real components, e.g., reflections and finite isolation. As shown in FIG. 10, we will assume that the IF, RF, and LO ports for the MUT are numbered as ports 1, 2, and 3 respectively. For specificity, we will assume that the LO and RF ports are the reference and offset frequency ports in Table 5, i.e., $f_{RF\alpha} = f_{LOD}$ and $f_{RF\beta} = f_{RFD}$. Then we can use (25) to represent the outgoing waves on the port 2 and 3 modules, which are connected to the RF and LO ports on the MUT (see FIG. 10), as $$a_{RFD}^{SB\beta}(t) = |A_{TxIn1} T_{Tx2}^{SB\beta}| \cos [2\pi(f_{LO} + SB\beta gf_{IF\beta})t + \upsilon_{LO} + \phi_{Tx2}^{SB\beta} + SB\beta g a_{TxIn2}] \quad (67)$$

$$a_{LOD}^{SB\alpha}(t) = |A_{TxIn3} T_{Tx3}^{SB\alpha}| \cos [2\pi(f_{LO} + SB\alpha gf_{IF\alpha})t + \upsilon_{LO} + \phi_{Tx3}^{SB\alpha} + SB\alpha g a_{TxIn3}], \quad (68)$$

where $f_{RFD} = f_{LO} + SB\beta gf_{IF\beta}$ and $f_{LOD} = f_{LO} + SB\alpha gf_{IF\alpha}$. The variables $SB\alpha$ and $SB\beta$ denote the mixer sidebands that are used on the LO and RF receivers, respectively. Note that both of these equations involve the same system LO frequency $f_{LO}$ and phase $\upsilon_{LO}$ since the same system LO is used for all the transmitters and receivers on ports 2 and 3.

We will utilize simple mixer models to represent the MUT, i.e., we will separate the ideal frequency-translating behavior from the non-ideal behavior, which will eventually be represented in terms of a 2-port Scattering Matrix. However, during this stage of the analysis, we will employ a simple transfer function since we are ignoring reflections. The special cases of "standard RF" ($f_{RFD} > f_{LOD}$) and "image" ($f_{RFD} < f_{LOD}$) MUTs will be handled separately.

For the case of standard RF mixers ($f_{RFD} > f_{LOD}$), reference to Table 5 shows that there are only plus signs in the 10$^{th}$ column. Therefore, since we must choose $SB\beta = +1$ in (67), the low-frequency signal that is output from the IF port of the MUT and digitized by the right ADC in port 2 can be represented as $$RxRt_1^{+,SB\alpha}(t) = |A_{TxIn2} T_{Tx2}^+ S_{12}^{IF} E_{Rf1}^{+,SB\alpha}| \cos [2\pi(f_{IF\beta} - SB\alpha gf_{IF\alpha})t + \phi_{Tx2}^+ - \phi_{Tx3}^{SB\alpha} + \phi_{S12}^{IF} + \phi_{Rf1}^{+,SB\alpha} + a_{TxIn2} - SB\alpha g a_{TxIn3}] = |A_{TxIn2} T_{Tx2}^+ S_{12}^{RF} E_{Rf1}^{+,SB\alpha}|g \cos [2\pi(f_{IF\beta} - SB\alpha gf_{IF\alpha})t + \phi_{Tx2}^+ - \phi_{Tx3}^{SB\alpha} + \phi_{S12}^{RF} + \phi_{Rf1}^{+,SB\alpha} + a_{TxIn2} - SB\alpha g a_{TxIn3}], \quad (69)$$

where $f_{IFD} = f_{IF\beta} - SB\alpha gf_{IF\alpha} \geq 0$. Note that the first superscript in $RxRt_1^{+,SB\alpha}(t)$ is a reminder that the upper sign was chosen in (67) (i.e., $SB\beta = +1$) and the second superscript indicates the sideband $SB\alpha$ in Table 5. Also note that the system's LO frequency and phase (i.e., $f_{LO}$ and $\upsilon_{LO}$) no longer appear in (69) since the same LO is employed for both the port-2 and port-3 modules. In (69), $|E_{Rf1}^{+,SB\alpha}|$ and $\phi_{Rf1}^{+,SB\alpha}$ represent the magnitude and phase of the port-1 right receiver path (see FIG. 12). Furthermore, we have used two models for the MUT to create the two equations in (69), i.e., $S_{12}^{IF}$ and $S_{12}^{RF}$ indicate that the non-ideal properties of the mixer are modeled on the IF and RF ports, respectively. Following the procedure in Chapter 3, we express (69) in the frequency domain as $$RxRt_1^{+,SB\alpha}(f_{IF\beta} - SB\alpha gf_{IF\alpha}) = A_{TxIn2} T_{Tx2}^+ S_{12}^{IF} [a_{LODN}^{SB\alpha}]^* E_{Rf1}^{SB\alpha} = A_{TxIn2} T_{Tx2}^+ S_{12}^{RF} [a_{LODN}^{SB\alpha}]^* E_{Rf1}^{+,SB\alpha}. \quad (70)$$

where we define the DUTs normalized input LO signal as $$a_{LODN}^{SB\alpha} = \exp[j(\phi_{Tx3}^{SB\alpha} + SB\alpha\alpha_{TxIn})]. \tag{71}$$

In this analysis we have assumed that the LO power is large enough that the mixer only responds to changes in the LO phase, and not the amplitude. Furthermore, the phase of the LO signal is defined relative to the RF phase, i.e., the unknown system LO phase $\upsilon_{LO}$ cancels out when the two high-frequency signals (67) and (68) are used as inputs to the MUT. Equation (70) shows that $$S_{12}^{RF} = S_{12}^{IF}. \tag{72}$$

When modeling an image mixer ($f_{RFD} < f_{LOD}$), die minus signs in column 6 of Table 5 show that we must choose the lower signs in (67), thereby yielding $$RxRt_1^{-,SB\alpha}(t) = |A_{TxIn2}T_{Tx2}^{-}S_{12}^{IF}E_{Rf1}^{-,SB\alpha}|\cos[2\pi(f_{IF\beta} + SB\alpha g f_{IF\alpha})t - \phi_{Tx2}^{-} + \phi_{Tx3}^{SB\alpha} + \phi_{S12}^{IF} + \phi_{Rf1}^{-,SB\alpha} + \alpha_{TxIn2} + SB\alpha g \alpha_{TxIn3}] = |A_{TxIn2}T_{Tx2}^{-}S_{12}^{IM}E_{Rf1}^{-,SB\alpha}|g\cos[2\pi(f_{IF\beta} + SB\alpha g f_{IF\alpha})t - \phi_{Tx2}^{-} + \phi_{Tx3}^{SB\alpha} - \phi_{S12}^{IM} + \phi_{Rf1}^{-,SB\alpha} + \alpha_{TxIn2} + SB\alpha g \alpha_{TxIn3}]. \tag{73}$$

Note that in this case most of the arguments of the cosine functions where multiplied by (−1) to keep the DUTs IF frequency positive in (73), i.e., $$f_{IFD} = -1 \times (-f_{IF\beta} - SB\alpha g f_{IF\alpha}) = f_{IF\beta} + SB\alpha g f_{IF\alpha} \geq 0. \tag{74}$$

This time we obtain a slightly different frequency-domain representation, $$RxRt_1^{-,SB\alpha}(f_{IF\beta} + SB\alpha g f_{IF\alpha}) = A_{TxIn2}[T_{Tx2}^{-}]^* S_{12}^{IF} a_{LODN}^{SB\alpha} E_{Rf1}^{-,SB\alpha} = A_{TxIn2}[T_{Tx2}^{-}S_{12}^{IM}]^* a_{LODN}^{SB\alpha} E_{Rf1}^{-,SB\alpha}, \tag{75}$$

which leads to $$S_{12}^{IM} = [S_{12}^{IF}]^* \tag{76}$$

In order to simplify the notation, we will define $S_{12}^{+} = S_{12}^{RF}$ and $S_{12}^{-} = S_{12}^{IM}$. We can then employ the underbar notation from Chapter 3 to rewrite (72) and (76) as $$S_{12}^{SB\beta} = \underline{S_{12}^{IF,SB\beta}}, \tag{77}$$

i.e., $S_{12}^{IF,+} = S_{12}^{IF}$ and $S_{12}^{IF,-} = [S_{12}^{IF}]^*$. Using this notation, we can then combine (70) and (73) into a single equation, $$RxRt_1^{SB\beta,SB\alpha}(f_{IF\beta} - SB\alpha g SB\beta g f_{IF\alpha}) = \underline{A_{TxIn2}T_{Tx2}^{SB\beta}[a_{LODN}^{SB\alpha}]^* E_{Rf1}^{SB\beta,SB\alpha}}, \tag{78}$$

where the value of the underbar operation is solely determined by the sign of SBβ.

4.4 Characterization of Up-Conversion MUTs

When measuring a MUT in the up-conversion mode, transmitters are required on both the IF and LO ports. If we represent the input signal into the DUT's IF port as $$a_1(t) = |A_{TxIn1}T_{Tx1}|\cos[2\pi f_{IF1}t + \phi_{Tx1} + \alpha_{TxIn1}], \tag{79}$$

then (68) and Table 5 can be used to express the up-converted signal that is flowing out of the RF port of the MUT as $$b_2^{SB\beta,SB\alpha}(t) = |A_{TxIn1}T_{Tx1}S_{21}^{IF,SB\beta}|\cos[2\pi(f_{LO} + SB\alpha g f_{IF\alpha} + SB\beta g f_{IF1})t + \upsilon_{LO} + \phi_{Tx3}^{SB\alpha} + SB\alpha g \alpha_{TxIn3} + SB\beta g(\phi_{Tx1} + \alpha_{TxIn1} + \phi_{S21}^{IF,SB\beta})] = |A_{TxIn1}T_{Tx1}S_{21}^{RF,SB\beta}|\cos[2\pi(f_{LO} + SB\alpha g f_{IF\alpha} + SB\beta g f_{IF1})t + \upsilon_{LO} + \phi_{Tx3}^{SB\alpha} + SB\alpha g \alpha_{TxIn3} + \phi_{S21}^{RF,SB\beta} + SB\beta g(\phi_{Tx1} + \alpha_{TxIn1})]. \tag{80}$$

Reference to (80) shows that we can define $$S_{21}^{SB\beta} = S_{21}^{RF,SB\beta} = \underline{S_{21}^{IF,SB\beta}}, \tag{81}$$

which has the same form as (77).

If we represent the magnitude and phase of the transfer function for the port-2 right receiver (see FIG. 6) by $|E_{Rf2}^{SB\beta,SB\alpha}|$ and $\phi_{Rf2}^{SB\beta,SB\alpha}$ employ (81), then the signal that is digitized by the right ADC can be represented as $$RxRt_2^{SB\beta,SB\alpha}(t) = |A_{TxIn1}T_{Tx1}S_{21}^{SB\beta}E_{Rf2}^{SB\beta,SB\alpha}|\cos[2\pi(f_{IF1} + SB\alpha g SB\beta g f_{IF\alpha})t + \phi_{Tx1} + \alpha_{TxIn1} + SB\beta g(\phi_{Tx3}^{SB\alpha} + SB\alpha g \alpha_{TxIn3} + \phi_{S21}^{SB\beta} + \phi_{Rf2}^{SB\beta,SB\alpha})]. \tag{82}$$

The corresponding frequency-domain expression is $$RxRt_2^{SB\beta,SB\alpha}(f_{IF1} + SB\alpha g SB\beta g f_{IF\alpha}) = \underline{A_{TxIn1}T_{Tx1}S_{21}^{SB\beta}a_{LODN}^{SB\alpha}E_{Rf2}^{SB\beta,SB\alpha}}, \tag{83}$$

where we once again use the definition for the LO phase that is given in (71) and the value of the underbar operation is solely determined by the sign of SBβ.

4.5 Calibration of the Mixer Measurement System

During the previous analysis we assumed that all the components are ideal. Signal-flow graphs are now used to account for the finite directivities and return losses of the components. For both the down- and up-conversion cases (i.e., (78) and (83)) we must measure the phase of the MUT's LO (71) (i.e., the phase of the outgoing signal on port-3). The AVEC technique (Chapter 3), and the associated signal flow graphs in FIG. 9, will be used for the calibration of this high-frequency LO transmitter/receiver module. In a similar manner, the AVEC technique can also be used for the calibration of the high-frequency transmitter/receiver module that is connected to the RF port of the MUT (see FIG. 10).

As shown in Chapter 3, the AVEC technique uses measurements on Short, Open, and Load (SOL) standards to determine the individual error terms in the signal-flow graphs in FIG. 9. The only terms that will not be uniquely determined are the relative LO phase terms that are associated with the calibration mixers on the two high-frequency measurement ports, i.e., $\delta_{LOC2}$ and $\delta_{LOC3}$. For the 1 port measurements that are discussed in Chapter 3, this relative LO phase term, which appears in the transmitter and receiver transfer functions (i.e., see (60)), was unimportant when comparing the relative phases within the receiver YIG bandwidth, or when comparing the phases between two receivers on the same port. However, since mixer measurements require two high-frequency ports, a relationship must be found between the two terms $\delta_{LOC2}$ and $\delta_{LOC3}$. This can be accomplished by adding a thru measurement to the calibration procedure prior to connecting to the MUT. In fact, once one high-frequency port has been calibrated using the AVEC technique, then it can serve as a vector standard for the absolute calibration of the other high-frequency ports. Therefore, the bidirectional Tx/Rx calibration path that appears in the high-frequency Tx/Rx module in FIG. 11 only needs to be present in one of the high-frequency Tx/Rx modules.

Before proceeding with the calibration, one must select how the mixer measurements are going to be made. In one measurement mode, the DUT mixer's RF and LO frequencies are swept together, thereby yielding a fixed IF frequency. In the second measurement mode, the DUT mixer's RF frequency is held fixed, and its LO and IF frequencies swept together. Finally, in the third measurement mode, the DUT mixer's LO frequency is held fixed, and it's RF and IF frequencies swept together. Once the measurement mode has been determined and the frequency ranges for the IF, RF, and LO ports have been determined, then the procedure that was used to make Table 5 and Table 6 is used to determine the common system LO frequencies and the port-2 and port-3 receiver settings that are required to produce the desired frequency sweep.

For the purpose of demonstration, here we will assume that we want to sweep the frequency on the DUT mixer's RF port, i.e., either the IF or LO port frequencies are fixed. After directly connecting the port-2 and port-3 high-frequency measurement modules together, then the AVEC technique is carried out at one of the RF frequencies on each high-frequency port, where the YIG filters on the LO measurement port are also set to the RF frequency during this stage of the calibration procedure. As described in Chapter 3, SOL measurements will provide the error terms for the signal flow graphs for each measurement probe. The calibrated RF (port 2) measurement module is then used to output a known signal, $$a_2^\pm(f_{LO} \pm f_{IFl}) = \frac{RxL_2^\pm(f_{Tx2})E_{Tx2}^\pm \exp(j\nu_{LO})}{[(1 - S_{22A}^\pm E_{Sm2}^\pm) + S_{22A}^\pm E_{Tx2}^\pm E_{Inc2}^\pm]}, \quad (84)$$

which is then measured as a calibrated input signal $$A_{Sig3}^\pm = RxRt_3^\pm(f_{IFSig3}) \frac{(1 - S_{33A}^\pm E_{Sm3}^\pm)}{E_{Rf3}^\pm \exp(j\nu_{LO})} \quad (85)$$

by the port-3 measurement module. Since $E_{Tx2}^\pm$ and $1/E_{Rf3}^\pm$ are proportional to the terms $\exp(+j\delta_{LOC2})$ and $\exp(+j\delta_{LOC3})$, respectively, a relationship between $\delta_{LOC2}$ and $\delta_{LOC3}$ is obtained by equating (58) and (54). Alternatively, if the port 3 Tx/Rx module doesn't have a bidirectional calibration leg, then the relationship between (58) and (54) can be used to directly find $E_{Rf3}^\pm$. Of course, a relative calibration of the port 3 Tx/Rx module using the SOL standards is necessary. Once $E_{Rf3}^\pm$, has been found, then we can absolutely calibrate the port 3 Tx/Rx module.

Figure 14:
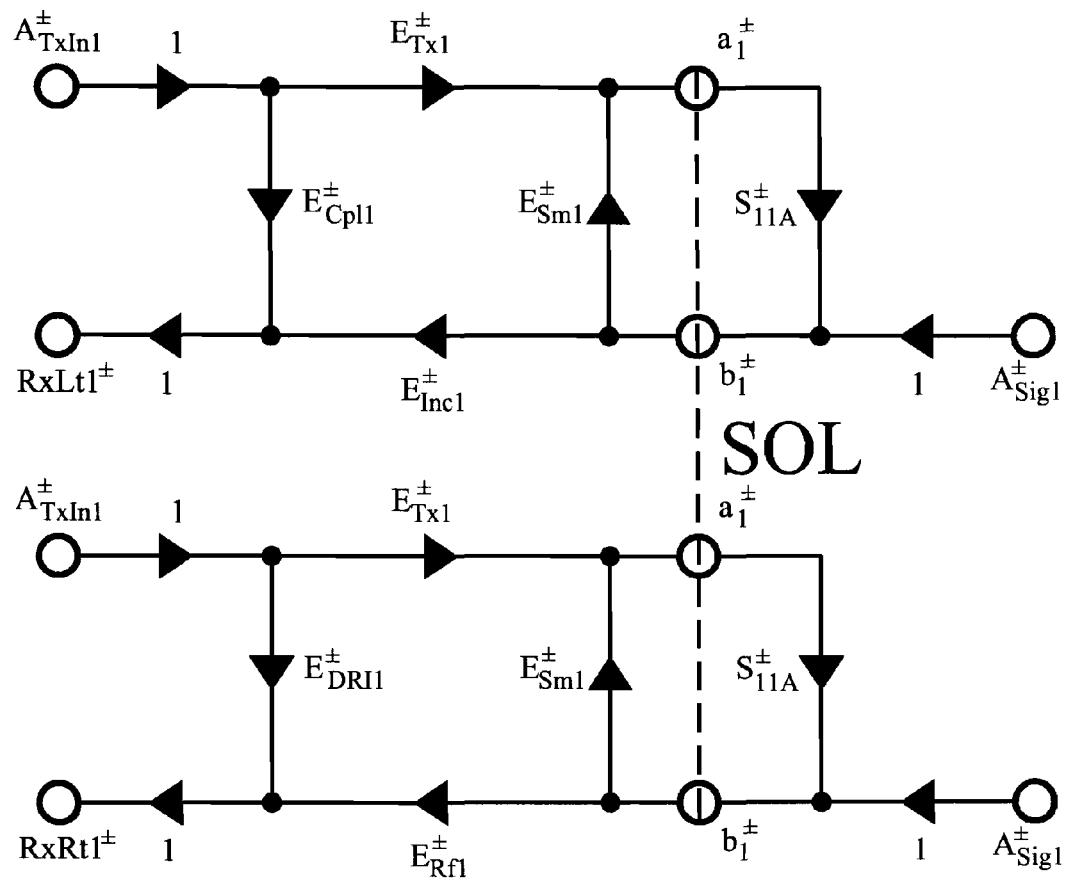
FIG. 14 shows the port-1 signal flow graphs for the vector calibration of the IF transmitter/receiver module with a preferred embodiment of the present invention.

The signal-flow graphs in FIG. 14 are used for the calibration of the IF transmitter/receiver module. As shown in Chapter 3, SOL standards are used to determine the error terms $E_{Cpl1}^\pm, E_{SM1}^\pm, E_{DRII}^\pm, E_{Tx1}^\pm E_{Inc1}^\pm$, and $E_{Tx1}^\pm E_{Rf1}^\pm$. However, instead of using the AVEC technique, which relies on a reciprocal signal path, we just measure a known calibration signal and use the known signal (see FIG. 12) to separate out the individual transfer functions, i.e., $E_{Tx1}^\pm$, $E_{Inc1}^\pm$ and $E_{Rf1}^\pm$.

Here we will define the phase of the LO as part of the mixer's scattering matrix (S-matrix). However, we will utilize the underbar notation to simplify the definition of the S-matrix. Reference to (78) and (83) shows that the mixer's S-matrix can be expressed as $$\begin{bmatrix} b_{IF}^\pm \\ b_{RF}^\pm \end{bmatrix} = \begin{bmatrix} S_{11}^\pm & S_{12}^\pm[a_{LODN}^{SB\alpha}] \\ S_{21}^\pm a_{LODN}^{SB\alpha} & S_{22}^\pm \end{bmatrix} \begin{bmatrix} a_{IF}^\pm \\ a_{RF}^\pm \end{bmatrix}. \quad (86)$$

The special case of an image mixer (the lower signs in (86)) is more complicated, i.e., (86) can be rewritten as $$\begin{bmatrix} b_{IF}^* \\ b_{IM} \end{bmatrix} = \begin{bmatrix} S_{11}^{IM} & S_{12}^{IM}[a_{LODN}^{SB\alpha}] \\ S_{21}^{IM} a_{LODN}^{SB\alpha} & S_{22}^{IM} \end{bmatrix} \begin{bmatrix} a_{IF}^* \\ a_{IM} \end{bmatrix}. \quad (87)$$

After taking the complex conjugate of (87), we obtain $$\begin{bmatrix} b_{IF} \\ b_{IM}^* \end{bmatrix} = \begin{bmatrix} S_{11}^{IM*} & S_{12}^{IM*} a_{LODN}^{SB\alpha} \\ S_{21}^{IM*}[a_{LODN}^{SB\alpha}]^* & S_{22}^{IM*} \end{bmatrix} \begin{bmatrix} a_{IF} \\ a_{IM}^* \end{bmatrix}. \quad (88)$$

4.6 Key Concepts of Vector Measurements on Mixers

1) A common LO provides a common phase reference for all high-frequency ports (e.g. for mixer measurements).

2) A triggered Nyquist-band ADC is used to provide the phase reference for baseband DUT measurements, e.g., the IF port (e.g. 1-500 MHz) of a mixer.

3) The 1.2 GS/s system clock is divided by either 6 or 7 to provide either a 200 MS/s or 171.4 MS/s clock input to the Nyquist ADC, thereby allowing for the direct measurement of the 1-500 MHZ IF band.

4) Only one high-frequency synthesizer is needed for all three ports of the mixer.

5) Typically, only one high-frequency probe is calibrated. A thru measurement may then be used to calibrate additional probes. Therefore, only one CNR mixer is needed per system.

5. Development of a New Wideband Absolute Vector Signal Harmonic Measurement Technique 5.1 Time-Domain Signal-Flow Analysis Including LO Mixer Harmonics The simplified test circuit in FIG. 15 contains the key elements that are needed to describe the WAVES harmonic measurement system, where a high-frequency transmitter/receiver module is shown in FIG. 4. Both time- and frequency-domain analyses were carried out on a one-port transmitter/receiver module in Chapter 3, where we assumed that the mixers only produced signals at the sum and difference frequencies. In this Chapter, we will include the LO harmonics in the analysis since these harmonics are the key to this new measurement system. Furthermore, since this application involves two transmitter/receiver modules that are connected to the two DUT ports (FIG. 15), we will use the variable p=1, 2 to denote the port. A common swept LO is used to maintain a phase reference between the two ports.

In order to produce signals at the desired harmonic frequencies during the calibration procedure, in general we switch the YIG filter on the transmitter leg out of the circuit. Therefore, the outgoing signal that appears at the port-p output can be represented as (see (25))

$$a_p^m(t) = |A_{TxInp}^m T_{Txp}^m| \cos[2\pi m(f_{LO} + f_{IFp})t + m\nu_{LO} + \phi_{Txp}^m + \alpha_{TxInp}^m], \quad (89)$$

where we only employ the upper mixer sideband in this patent, and the superscript m=1, 2, 3, . . . represents the various LO mixer harmonics, e.g., m=1 corresponds to fundamental mixing. Later we will find that the variable m is also related to the DUT harmonic order that is being measured. This is the reason that we have assumed the IF frequency that is produced by the input transmitter DAC is given by $mf_{IFp}$.

If we use the same LO harmonic for down conversion as is used for up conversion in (25), then we find that the received baseband signal in the Cal transmitter/receiver channel can be expressed as $$RxCp^m(t) = |A_{TxInp}^m T_{Txp}^m S_{ppA}^m T_{Calp}^m T_{Dnp}^m| \cos[2\pi m \cdot f_{IFp}t + (\phi_{Txp}^m + \phi_{SppA}^m + \phi_{Calp}^m - m\delta_{LOCp}) + \alpha_{TxInp}^m + \phi_{Dnp}^m], \quad (90)$$

which is very similar to (26), with the exception of the m that is multiplying the IF frequency and the static LO phase difference, i.e., $\delta_{LOCp}$. Furthermore, the subscript p has been added to denote the port-p transmitter/receiver module. Similar expressions to those in (27)-(29) can also be derived.

This Chapter focuses on a new method for making vector measurements of DUT harmonics. During measurements, we will assume that port-1 is connected to the input of a nonlinear DUT and port-2 is connected to the DUT's output (FIG. 15). Therefore, we will first assume that the m=1 case for the output tone signal in (25) serves as the input to the nonlinear DUT. If we ignore reflections at the DUT's input for the time being, then the signal that is output from the nonlinear DUT can be represented by $$b_2''(t) = |A_{TxIn1}^1 T_{Tx1}^1| \sum_{n=1}^{N} |S_{21}^n| \qquad (91)$$
$$\cos[2\pi n(f_{LO} + f_{IF1})t + n(\upsilon_{LO} + \phi_{Tx1}^1 + \alpha_{TxIn1}^1) + \phi_{S21A}^n],$$

where we have summed up the first N harmonics. If we tune the YIG filters to pass the $n^{th}$ harmonic and employ the $n^{th}$ LO harmonic to down convert the received signals in the port-2 receivers, then the baseband signal in the right port-2 receiver can be expressed as $$RxRt2^n(t) = |A_{TxIn1}^1 T_{Tx1}^1 S_{21}^n T_{RxRt2}^n| \cos [2\pi n f_{IF1} t + n(\phi_{Tx1}^1 + \alpha_{TxIn}^1) + \phi_{S21A}^n + \phi_{RxRt2}^n]. \qquad (92)$$

Since the measurement system is designed around 200 MSa/S ADCs, we will use different Nyquist bands in the ADCs to measure the various DUT harmonics. As shown in columns 6-7 in Table 7, we will assume that the IF frequency for the port-1 input signal (see (25) where m=1) lies in the frequency range $89 \leq f_{IF1} \leq 91$ MHz (a 2 MHz bandwidth is provided for multi-tone input signals). Reference to (32) shows that the baseband port-2 signals then appear at $nf_{IF1}$, where n denotes the DUT harmonic number. The signals for the various harmonics are digitized after switching in the proper Nyquist band filter, as shown in Table 7.

5.2 Extension of the AVEC Technique to Measurements of DUT Harmonics

In this section we discuss how the AVEC technique can be modified in order to allow for the calibrated vector measurement of DUT harmonics. Since this is a wideband measurement technique, we will refer to it as the WAVES harmonic measurement technique. In order to establish a phase reference between the fundamental and the higher-order mixing products, this technique relies on the use of a common LO for the two ports (FIG. 15) and the use of higher-order LO mixer harmonics in the system receivers.

Since this is a two-port measurement system, we will need to modify the one-port AVEC technique that was developed in Chapter 3. As shown in Chapter 3, the AVEC technique uses measurements on Short, Open, and Load (SOL) standards to determine the individual error terms in the signal-flow graphs in FIG. 9. The only terms that will not be uniquely determined are the relative LO phase terms that are associated with the calibration mixers on the two measurement ports, i.e., $m\delta_{LOC1}$ and $n\delta_{LOC2}$. For the 1 port measurements that are discussed in Chapter 3, the relative LO phase term, which appears in the transmitter and receiver transfer functions, was unimportant when comparing the relative phases within the receiver YIG bandwidth, or when comparing the phases between two receivers on the same port. However, since DUT harmonic measurements require two high-frequency ports, a relationship must be found between the two terms $m\delta_{LOC1}$ and $n\delta_{LOC2}$. This can be accomplished by adding a thru measurement to the calibration procedure prior to connecting to the nonlinear DUT.

After directly connecting the port-1 and port-2 high-frequency measurement modules together, the AVEC technique is then carried out at the desired RF frequency, i.e., for the case of a single input tone, $f_{IF1}=90$ MHz and $f_{LO}=f_{RF}^1-f_{IF1}$. As described in Chapter 3, SOL measurements will provide the error terms for the signal flow graphs for each measurement module. The calibrated port-1 measurement module is then used to output a known signal (see (51)), $$a_i^m(m(f_{LO} + f_{IF1})) = \frac{RxLt_i^m(mf_{IF1})E_{Tx1}^m \exp(jm\upsilon_{LO})}{[(1 - E_{Sm1}^m E_{Sm2}^m) + E_{Sm2}^m E_{Tx1}^m E_{Incl}^m]}, \qquad (93)$$

where we have set $S_{11A}^m = E_{Sm2}^m$ since this case is for a thru DUT. The signal in (93) is then measured as a calibrated input signal (see (52))

$$A_{Sig2}^m = RxRt_2^m(mf_{IF1}) \frac{(1 - E_{Sm1}^m E_{Sm2}^{\pm})}{E_{Rf2}^{\pm} \exp(-jm\upsilon_{LO})} \qquad (94)$$

by the port-2 measurement module, where we have set $S_{22A}^m = E_{Sm1}^m$ and $f_{IF2} = f_{IF1}$. Since $E_{Tx1}^m$ and $1/E_{Rf2}^m$ are proportional to the terms $\exp(+jm\delta_{LOC2})$ and $\exp(+jm\delta_{LOC2})$, respectively, a relationship between $\delta_{LOC1}$ and $\delta_{LOC2}$ is obtained by equating (58) and (54). Once one high-frequency port has been calibrated using the AVEC technique, then it can serve as a vector standard for the absolute calibration of the other high-frequency ports. Therefore, the bidirectional Tx/Rx calibration path that appears in the high-frequency Tx/Rx module in FIG. 4 only needs to be present in the port 1 high-frequency Tx/Rx module. In this case, the relationship between (93) and (94) can be used to directly find $E_{Rf2}^{\pm}$. Of course, a relative calibration of the port 2 Tx/Rx module using the SOL standards is necessary. Once $E_{Rf2}^{\pm}$ has been found, then we can absolutely calibrate the port 2 Tx/Rx module.

In order to measure the DUT harmonics, the non-linear DUT is then connected between ports 1 and 2, where we will assume that ports 1 and 2 are the input and output ports, respectively. The vector signal, which is created at the fundamental frequency $f_{LO}+f_{IF1}$ and is input into port-1 of the DUT, can be accurately measured by using (93) where m=1. The signals that are output from port-2 of the DUT at the fundamental frequency and the first four harmonic frequencies (i.e., $m(f_{LO}+f_{IF1})$) can then measured sequentially using (6) for m=1, 2, . . . , 5. A comparison between the harmonics at the output port and the fundamental at the input port provides desired information about the harmonic properties of the nonlinear DUT.

FIG. 16 shows a diagram illustrating the down-conversion of the RF harmonics to the IF bands. The RF bandwidth starts at 2 MHz for the fundamental. Bandwidths at successive RF harmonics increase by the harmonic number, i.e. 4, 6, 8, and 10 MHz.

5.3 Summary of Key Aspects of the WAVES Harmonic Measurement System

1) Receivers with offset center frequencies can be used to measure the harmonics produced by non-linear DUTs 2) A tunable filter on one receiver is used to select the fundamental frequency, which is used as a reference for vector measurements. The tunable filter on the second receiver is used to select successive harmonics for analysis.

3) Individual measurements are made at the reference frequency with 2 MHz bandwidth and at the nth harmonic frequency with bandwidths of 2*n MHz multiple times to successively measure, for example, 5 harmonics. All measurements are referenced to the fixed reference band.

4) Fundamental mixing is used to down-convert the fundamental signal to the fundamental ADC Nyquist band (e.g. 90 MHz center) and nth harmonic mixing is used to down-convert the nth harmonic signal to nth Nyquist band (e.g. n*90 MHz center) within the ADC's 500 MHz bandwidth.

6. Conclusions

We have designed a fundamentally new instrument, which combines the capabilities of three instruments in a unique manner that overcomes the limitations of each instrument:

A) Spectrum Analyzers (SAs) provide absolute magnitude measurements over a wide bandwidth (e.g. 2-20 GHz) and can provide absolute phase relationship measurements over a small instantaneous bandwidth (e.g. approximately 50 MHz). SAs have the following advantages: high dynamic range (e.g. 150 dB), they can use narrow-band RF filtering for preselection to avoid spurious signals, and they can use preamplifiers for optimum noise figure. SAs have the following limitations: The instantaneous bandwidth over which phase can be measured may be much too small for current wide-bandwidth applications. In addition, the RF preselection filters can lead to unacceptable measurement errors (e.g. several dB and tens of degrees) in certain applications.

B) Vector Network Analyzers (VNAs) can provide relative S-parameter measurements over a wide bandwidth (e.g. 2-20 GHz). VNAs have the following advantages: relative vector error correction and high accuracy (0.1 dB and 1 degree). Conventional VNAs have the following limitations: There is no absolute phase relationship measurement between different frequencies. Also, there is no swept preselection filter to eliminate spurious signals.

C) Sampling oscilloscopes are used for absolute magnitude and absolute phase relationship measurements over wide bandwidths (e.g. 1 to 20 GHz). A serious limitation of sampling oscilloscopes is the limited dynamic range inherent in this technology (e.g. 20 to 40 dB with practical data-acquisition times). Several other related instruments, such as the Large Signal Network Analyzer, use a down-conversion circuit, which is based on the same principle as the sampling oscilloscope, and which have the same limited dynamic range.

The new Wideband Absolute VEctor Signal (WAVES) measurement system uses two receiver channels per measurement port, and provides absolute magnitude and absolute phase relationship measurements over wide bandwidths (e.g. approximately 2 GHz). Gain ranging is used at RF to provide optimum noise performance and a swept YIG preselector filter is used to avoid spurious signals. A new Absolute Vector Error Correction (AVEC) method is used to calibrate the WAVES measurement system in order to allow for absolute vector measurements and it also removes the time-varying responses caused by the swept YIG preselector filters. The WAVES measurement system, therefore, has all the advantages of both the SA and the VNA instruments, without any of the limitations.

A sampling oscilloscope and a quasi-reciprocal mixer with a characterized non-reciprocal ratio are used at RF to provide the absolute calibration standard for the WAVES measurement system. Since the sampling oscilloscope is used only with known, high signal-to-noise calibration signals, there are no problems with the limited dynamic range of the sampling scope.

The two receiver channels in the WAVES receiver can be adapted to a wide variety of applications, including wide bandwidth vector signal analyzer measurements, network analyzer measurements, mixer measurements, and harmonic measurements. The two-channels can also be used as an absolute calibrated transmitter/reflectometer.

In summary, we have successfully developed a new measurement system that combines:

1) The wide bandwidth of a sampling oscilloscope (e.g. 2 GHz or greater bandwidth over a frequency range of 0.5 to 20 GHz). This is made possible by the simultaneous measurement of many phase-related, narrow-band data sets. In contrast to the sampling oscilloscope, the WAVES measurement system has a much larger dynamic range and greater accuracy.

2) The high accuracy of a vector network analyzer (e.g. 0.1 dB and 1 degree). This is made possible by the AVEC calibration technique that utilizes four unique vector-signal-flow graphs. Unlike the vector network analyzer, which has only a relative calibration, the WAVES measurement system has an absolute calibration.

3) The large dynamic range of the spectrum analyzer (e.g. 150 dB). This is made possible by the use of calibrated narrow-band preselector (e.g. YIG) filters and gain ranging in the front end. Unlike the spectrum analyzer, the WAVES measurement system calibrates the time-varying front-end components and measures both absolute amplitude and absolute phase relationships over a wide bandwidth.

Following is a list of the key concepts of the Wideband Absolute Vector Signal (WAVES) measurement system:

1) A new vector-calibrated instrument provides absolute magnitude and phase relationships over 2 GHz segments within a full microwave bandwidth (e.g. 2-20 GHz),
   a) A transmitter, a bidirectional Tx/Rx signal path and two unidirectional Rx paths are used in a novel absolute vector calibration method.
   b) A common LO signal is employed for the mixers in these three signal paths to allow a common phase reference.
   c) A characterized non-reciprocal ratio (CNR) mixer is used in the bidirectional Tx/Rx signal path as a traceable standard.
      i) The CNR is built in to the calibration algorithm.
      ii) The CNR is traceable to the NIST Electro-Optic (EO) standard.
      iii) The CNR is proven stable with changes with temperature, LO drive level, and time,
      iv) The CNR mixer is used together with a relative error correction technique (e.g. SOL) to provide absolute magnitude and phase relationships over 2 GHz segments within the full microwave bandwidth.
   d) Tunable preselector (YIG) filters are employed in the two unidirectional receiver paths to select frequency bands for analysis.
      i) Calibrated preselectors allow upconversion to be used to create the required transmitter signals.
      ii) Calibrated preselectors and gain-ranging amplifiers provide greatly improved dynamic range.
   e) The three-way splitter on the left receiver makes it possible to measure both incident and thru signals,
   f) A single high-frequency swept synthesizer is used as the LO.
   i) A common LO is used to down-convert the received signals and up-convert the transmitter and calibration signals to provide a common phase reference.
   g) Nyquist bands of a high-resolution ADC at baseband are used for optimum S/N and dynamic range,
   h) Absolute phase relationships can be obtained over the full microwave bandwidth by stitching together overlapping 2 GHz segments with common reference signals.

2) Calibration
   a) Determining the measurement-system error coefficients
      i) Use of four parallel signal flow graphs,
         (1) TxIn to RxLt
         (2) TxIn to RxRt
         (3) TxIn to RxC (CNR mixer path)
         (4) TxC to RxRt (CNR mixer path)
      ii) All four signal flow graphs have the same source-match errors.

iii) The ratio of the receiver and transmitter tracking errors, which appear in the third and fourth signal flow graphs, are determined using the stable CNR mixer.

iv) SOL standards are used to perform a relative calibration, i.e. find source match, directivity error, and combined transmitter/receiver tracking errors for each of the four signal flow graphs.

v) The four signal flow graphs are combined to separate the transmitter and receiver tracking errors, thereby providing an absolute calibration.

b) Updating the error coefficients for each measurement.

i) Simplified updated calibrations are made before each data measurement to account for the time-varying preselector and gain-ranging components.

ii) The calibrated TxIn transmitter (without the YIG preselector) signal is used with the short standard at the instrument input to calibrate each receiver.

iii) Simultaneously transmitted multiple Cal tones are used to interpolate and calibrate the receiver's response over its (36 MHz) bandwidth.

iv) The Cal tones can be used to center the YIG filter if necessary.

3) Each measurement port, with two receivers, is designed to be used for multiple purposes.

a) Source with measurement of incident and reflected signals (reflectometer).

i) Conventional capability with moderate (e.g. 36 MHz) simultaneous bandwidth.

b) Receivers with the same center frequencies and with instantaneous and moderate bandwidths (e.g. 36 MHz bandwidth)

i) Fundamental mixing with the same sideband on the two receivers.

ii) Use of the two receiver paths on a port to check for measurement-system nonlinearities.

(1) The two receiver paths differ by 10 dB, so nonlinearities can be detected when the same frequency signals are being measured by the two receivers.

iii) Can add a dynamic calibration signal to each receiver for simultaneous calibration and data collection.

(1) The two receivers have dynamic calibration tones at different frequencies so that interference from the data can be removed from the calibration tones and interference from the calibration tones can be removed from the data.

c) Multiple receivers with offset center frequencies, with instantaneous and increased bandwidths.

i) Two receivers in one port provide 72 MHz instantaneous bandwidth.

ii) Combining N receivers from N/2 ports can provide N*36 MHz instantaneous bandwidth.

d) Receivers with offset center frequencies and with large, but non-instantaneous, bandwidth (e.g. +/−952 MHz measured bandwidth).

i) A tunable filter on one receiver is used to select a reference band for vector measurements and the tunable filter on the second receiver is used to select another band for analysis at the offset frequencies.

ii) Individual measurements are made over 36 MHz bandwidths multiple times to fill up the entire +/−952 MHz bandwidth. All measurements are referenced to the fixed reference band.

iii) Fundamental mixing is used to down-convert the microwave signals on each receiver to one of the 100 MHz Nyquist bands within the ADC's 500 MHz bandwidth.

iv) Combinations of upper and lower mixer sidebands are used to provide the full +/−952 MHz analysis bandwidth.

v) A table has been developed to determine which Nyquist band and which mixer sideband is used for each offset frequency.

e) Receivers with offset center frequencies and with full, but non-instantaneous, microwave bandwidth (e.g. 0.5-20 GHz successively measured bandwidth) at harmonically related frequencies.

i) A tunable filter on one receiver is used to select the fundamental frequency, which is used as a reference for vector measurements. The tunable filter on the second receiver is used to select successive harmonics for analysis.

ii) Individual measurements are made at the reference frequency with 2 MHz bandwidth and at the nth harmonic frequency with bandwidths of 2*n MHz multiple times to successively measure, for example, 5 harmonics. All measurements are referenced to the fixed reference band.

iii) Fundamental mixing is used to down-convert the fundamental signal to the fundamental ADC Nyquist band (e.g. 90 MHz center) and nth harmonic mixing is used to down-convert the nth harmonic signal to nth Nyquist band (e.g. n*90 MHz center) within the ADC's 500 MHz bandwidth.

4) This new vector-calibrated instrument can be extended to N-port measurements, which provide absolute magnitude and phase relationships over the full microwave bandwidth (e.g. 0.5-20 GHz).

a) Application to vector measurements on mixers.

i) A common LO provides a common phase reference for all ports (e.g. for mixer measurements).

ii) A triggered Nyquist-band ADC is used to provide the phase reference for baseband DUT measurements, e.g., the IF port (e.g. 1-500 MHz) of a mixer.

iii) The 1.2 GS/s system clock is divided by either 6 or 7 to provide either a 200 MS/s or 171.4 MS/s clock input to the Nyquist ADC, thereby allowing for the direct measurement of the 1-500 MHZ IF band.

iv) Only one high-frequency synthesizer is needed for all three ports of the mixer.

b) Typically, only one probe is calibrated. A thru measurement may then be used to calibrate additional probes. Therefore, only one CNR mixer is needed per system.

c) The system can be used for conventional and wideband (e.g. 36 MHz) vector network analyzer (VNA) measurements, multi-channel, ultra-wideband (e.g. +/−952 MHz) vector signal analyzer (VSA) measurements, and nonlinear tests of DUT harmonics over a full microwave band (e.g. 0.5 to 20 GHz).

APPENDIX

The procedure for wideband calibration and measurement is summarized below. In this appendix we will assume that $p=\alpha$ and $p=\beta$ identify the left and right receivers, respectively. Note that the left receiver ($p=\alpha$) will measure the reference frequency band when wideband measurements are being made. The calibration procedure has two different stages: I) Factory calibration and II) User calibration. The steps in each of these stages are described below.

I) Factory Calibration (e.g., Performed Yearly)

A) Factory calibration of the $\sqrt{T_{Up}^{\pm}/T_{Dn}^{\pm}}$ ratio

1) For $f_{RF\alpha}=f_{RF\beta}=2$ GHz (beginning of sweep range) and $f_{IF\alpha}=f_{IF\beta}=133$ MHz (from Table 4), make AVEC (see step II-B-1 below) measurements on SOL standards with a set of tones (62) to perform relative and absolute calibrations up to the unknown $\sqrt{T_{Up}^{\pm}/T_{Dn}^{\pm}}^{35}$ factor in $E_{Tx}^{\pm}$ (see (60)) over a 36 MHz bandwidth. Note that both the left and right receivers are configured to measure the same RF and IF frequencies for this case.

2) Connect the port output to a calibrated sampling oscilloscope that is used to measure the vector output signal at the center frequency $J_{RF\alpha}$.

3) Equate this measured output signal to the signal that is calculated using (51), where (60) has been substituted into (51) for $E_{Tx}$. It is then possible to solve for the unknown ratio that we will denote as $\sqrt{\tilde{T}_{Up}^{\pm}/\tilde{T}_{Dn}^{\pm}}$ for this combination of $f_{RF\alpha}=f_{RF\beta}$ and $f_{IF\alpha}=f_{IF\beta}$. We have included tildes over the transfer functions to denote that this ratio was measured at the factory. Note that the mismatch associated with the oscilloscope input will be accounted for when using (51) since this equation includes the measured reflection coefficient associated with the oscilloscope, i.e., $S_{11A}^{\pm}$.

4) Repeat the above steps 1-3 multiple times in order to calibrate all the IF bands, i.e., $f_{IF\alpha}=f_{IF\beta}=167, 233, 267, 333, 367, 433,$ and 467 MHz (see Table 4).

5) Repeat the above steps 1-4 multiple times to calibrate all the RF bands where 2 GHz $\leq f_{RF\alpha} \leq 20$ GHz, i.e., $f_{RF\alpha}=2$ GHz+$q_{RF} \times 34$ MHz, where $q_{RF}=1, 2, \ldots, 53$ (see Table 4).

B) Absolute factory calibration of the low-frequency calibration transmitter DAC.

C) Factory measurements of the baseband high-order filters and variable amplifier in the calibration receiver 1) Switch the switches that are shown at the points A and B in FIG. 4 to their other states.

2) For $f_{IF\alpha}=133$ MHz, measure $\tilde{T}_{BPF}^{\pm}$, which represents the value of the transfer function for the transmission path between the calibration DAC and the calibration ADC, for a set of transmitted calibration tones.

3) Repeat the last step 2 multiple times for $f_{IF\alpha}=167, 233, 267, 333, 367, 433,$ and 467 MHz.

II) User Calibration

A) User calibration of the baseband high-order filters and variable amplifier in the calibration receiver (e.g., performed daily or whenever the amplifier gain is changed)

1) Repeat the steps in item I-C and re-measure $T_{BPF}^{\pm}$.

2) The modified ratio $$\sqrt{\frac{T_{Up}^{\pm}}{T_{DM}^{\pm}}} = \sqrt{\frac{\tilde{T}_{Up}^{\pm} \tilde{T}_{BPF}^{\pm}}{\tilde{T}_{Dn}^{\pm} T_{BPF}^{\pm}}} \quad (95)$$

will allow for the removal of the effects of the filter drift since the time of the factory calibration, and can be used in (60) to provide an accurate measure of $E_{TX}^{\pm}$.

B) User calibration and measurements over the YIG filter bandwidth centered at $f_{RF\alpha}=f_{RF\beta}$(e.g., performed for each new measurement configuration).

1) Perform the AVEC technique with a set of transmitted input and calibration tones (e.g., (62)) on SOL standards to provide relative and absolute calibrations
  a) Calibration of the relative reflection coefficient
    (i) Compute the error terms for the top two signal-flow graphs in FIG. 9, i.e., (7)-(9), and (42) and (45).
  b) Simultaneous absolute calibration of the outgoing and incoming vector voltages
    (i) Compute $E_{Tx}^{\pm}$ by using (60) where $A_{TxIn}$ is given in (15) and $\sqrt{T_{Up}^{\pm}/T_{Dn}^{\pm}}$ is computed using (43).
    (ii) Compute $E_{Inc}^{\pm}$ and $E_{Rf}^{\pm}$ by dividing (42) and (45) by (60).

2) Make measurements over the YIG filter bandwidth
  a) The result in (60) can be employed in (51) to determine the outgoing traveling-wave voltage at the test port when the module is being used as a calibrated transmitter.
  b) The resulting expressions for $E_{Inc}^{\pm}$ and $E_{Rf}^{\pm}$ can be employed in (53) and (54) to obtain two measures of the incoming traveling-wave voltage when the module is operating as a receiver.

C) User calibration and measurements over a wide bandwidth. Here we will use the results in Table 3 for demonstration purposes.

1) Perform the AVEC procedure and make reference measurements (see II-B-1) with the YIG filters in both receivers centered at the reference frequency, e.g., $f_{RF\alpha}=f_{RF\beta}=5000$ MHz. Note that signals with adequate levels must be present within the reference frequency band. Furthermore, it is best to use the left receiver as the reference channel since it has more isolation from the DUT. Any changes associated with the left YIG filter's return loss will be isolated from the system input by at least 40 dB if either the amplifier, with a minimum of 18 dB directivity, or a $\geq 10$ dB attenuator is selected.

2) Measurement band below the reference band $f_{RF\beta}<f_{RF\alpha}$.
  a) Make offset-frequency measurements with $f_{RF\beta}=4966$ MHz and $f_{RF\alpha}=5000$ MHz.
    (i) Perform the AVEC procedure (see II-B-1) with the YIG filters in both receivers centered at the frequency $f_{RF\alpha}=f_{RF\beta}=4966$ MHz.
    (ii) Reposition the YIG filter in the left receiver to the reference frequency $f_{RF\alpha}=5000$ MHz. Since the YIG's transfer function may have changed from step II-C-1) above, re-measure $E_{Inc}^{\pm}$ by reflecting a known input transmitter signal off of a short DUT, i.e., using (40) and (41) we find that $$E_{Inc}^{\pm} = \frac{[1+E_{Sm}^{\pm}]}{E_{Tx}^{\pm}}\left[E_{Cpl}^{\pm} - \frac{RxL^{\pm}(f_{In})}{A_{TxIn}}\right]. \quad (96)$$

(iii) Simultaneously measure the signals that are centered about $f_{RF\alpha}=5000$ MHz in the left receiver and $f_{RF\beta}=4966$ MHz in the right receiver using a common LO and the absolutely calibrated receiver channels.
  b) Repeat step a) above for the other values of $f_{RF\beta}$ that are given in the seventh column of Table 4.

3) Measurement band above the reference band $f_{RF\beta}>f_{RF\alpha}$. Repeat step 2 above for the values of $f_{RF\beta}$ that are given in the eleventh column of Table 4.

TABLE 1

Symbols for the static error terms that are employed in the signal-flow graphs for the baseband AVEC technique (see FIG. 8).

| Symbol | |
|---|---|
| $T_{Up}$ | Transmission coefficient from the Cal transmitter to the point C. |
| $T_{Dn}$ | Transmission coefficient from the point C to the Cal receiver. |
| $E_{Tx}$ | Transmission coefficient for the transmitter signal path. |
| $E_{Inc}$ | Transmission coefficient for the incident (left) receiver signal path. |
| $E_{Rf}$ | Transmission coefficient for the reflection receiver signal path. |
| $E_{Cal}$ | Transmission coefficient for the reciprocal calibration signal path. |
| $E_{Cpl}$ | Coupling error between the transmitter and incident receiver signal paths. |
| $E_{DRI}$ | Directivity error between transmitter and incident receiver signal paths. |
| $E_{DCI}$ | Directivity error between the calibration and incident signal paths. |
| $E_{DRC}$ | Directivity error between the calibration and reflection signal paths. |
| $E_{Sm}$ | Source match errors. |

TABLE 2

Symbols for the terms that are employed in the ideal, time-domain, signal-flow analysis. Note that the upper and lower symbols (i.e., ±) denote the responses for the sum and difference frequencies that are produced by the mixer.

| Symbol | | Descriptions for the static port-1 variables |
|---|---|---|
| Magnitude | Phase | |
| $|A_{TxIn}|$ | $\alpha_{TxIn}$ | Transmitter tone produced by the input TxIn source. |
| N.A. | $\nu_{LO}$ | Variable phase for the swept-frequency LO. |
| $|T_{Tx}^{\pm}|$ | $\phi_{Tx}^{\pm}$ | Transmission coefficient for the transmitter signal path. |
| $|S_{11A}^{\pm}|$ | $\phi_{S11A}^{\pm}$ | Actual reflection coefficient for the DUT. |
| $|T_{Cal}^{\pm}|$ | $\phi_{Cal}^{\pm}$ | Transmission coefficient for the quasi-reciprocal Cal signal path. |
| $|T_{Dn}^{\pm}|$ | $\phi_{Dn}^{\pm}$ | Models the non-reciprocity in the Cal mixer for down-conversion and the transmission coefficient for the IF portion of the Cal receiver signal path. |
| N.A. | $\delta_{LOC}$ | Phase difference associated with the swept-frequency LO for the Cal mixer relative to the LO phase for the right receiver mixer. |
| $|T_{RxRt}^{\pm}|$ | $\phi_{RxRt}^{\pm}$ | Transmission coefficient for the reflected (right) receiver path. |
| $|T_{Cpl}^{\pm}|$ | $\phi_{Cpl}^{\pm}$ | Transmission coefficient for the coupled incident signal path. |
| $|T_{RxLt}^{\pm}|$ | $\phi_{RxLt}^{\pm}$ | Transmission coefficient for the incident (left) receiver path. |
| $|A_{TxC}|$ | $\alpha_{TxC}$ | Calibration tone produced by the Cal source. |
| $|T_{Up}^{\pm}|$ | $\phi_{Up}^{\pm}$ | Models the non-reciprocity in the Cal mixer for upconversion and the transmission coefficient for the IF portion of the Cal transmitter signal path. |
| $|A_{Sig1}|$ | $\alpha_{Sig1}$ | Tone that is input into port 1. |

TABLE 3

Description of the switched IF filter banks that are used to avoid aliasing in the 200 MS/s Nyquist band ADCs.

| Nyquist band number | Nyquist frequencies | | Filter cutoffs | |
|---|---|---|---|---|
| | Lower MHz | Upper MHz | Lower MHz | Upper MHz |
| 2 | 100 | 200 | 116 | 184 |
| 3 | 200 | 300 | 216 | 284 |
| 4 | 300 | 400 | 316 | 384 |
| 5 | 400 | 500 | 416 | 484 |

TABLE 4

An example that shows how to make wideband (i.e., up to $f_{RF\alpha} \pm 952$ MHz) relative phase measurements. Changes in the LO and IF frequencies, together with variable YIG filters (bandwidth = 36 MHz) and the use of different mixer sidebands, are used to sequentially move the center frequency of the measurement band $f_{RF\beta}$ while keeping the reference band fixed at $f_{RF\alpha} = 5000$ MHz in this example.

| Common for both cases | | | f_RFβ below f_RFα | | | | f_RFβ above f_RFα | | | | Offset |
|---|---|---|---|---|---|---|---|---|---|---|---|
| f_RFα (MHz) | f_IFα (MHz) | f_IFβ (MHz) | f_LO (MHz) | SBα | SBβ | f_RFβ (MHz) | f_LO (MHz) | SBα | SBβ | f_RFβ (MHz) | f_Off (MHz) |
| 5000 | 133 | 133 | 5133 | − | − | 5000 | 4867 | + | + | 5000 | 0 |
| 5000 | 133 | 167 | 5133 | − | − | 4966 | 4867 | + | + | 5034 | 34 |
| 5000 | 167 | 233 | 5167 | − | − | 4934 | 4833 | + | + | 5066 | 66 |
| 5000 | 133 | 233 | 5133 | − | − | 4900 | 4867 | + | + | 5100 | 100 |
| 5000 | 133 | 267 | 5133 | − | − | 4866 | 4867 | + | + | 5134 | 134 |
| 5000 | 167 | 333 | 5167 | − | − | 4834 | 4833 | + | + | 5166 | 166 |
| 5000 | 133 | 333 | 5133 | − | − | 4800 | 4867 | + | + | 5200 | 200 |
| 5000 | 133 | 367 | 5133 | − | − | 4766 | 4867 | + | + | 5234 | 234 |
| 5000 | 133 | 133 | 4867 | + | − | 4734 | 5133 | − | + | 5266 | 266 |
| 5000 | 167 | 133 | 4833 | + | − | 4700 | 5167 | − | + | 5300 | 300 |
| 5000 | 167 | 167 | 4833 | + | − | 4666 | 5167 | − | + | 5334 | 334 |
| 5000 | 133 | 233 | 4867 | + | − | 4634 | 5133 | − | + | 5366 | 366 |
| 5000 | 167 | 233 | 4833 | + | − | 4600 | 5167 | − | + | 5400 | 400 |
| 5000 | 167 | 267 | 4833 | + | − | 4566 | 5167 | − | + | 5434 | 434 |
| 5000 | 233 | 233 | 4767 | + | − | 4534 | 5233 | − | + | 5466 | 466 |
| 5000 | 267 | 233 | 4733 | + | − | 4500 | 5267 | − | + | 5500 | 500 |
| 5000 | 267 | 267 | 4733 | + | − | 4466 | 5267 | − | + | 5534 | 534 |
| 5000 | 233 | 333 | 4767 | + | − | 4434 | 5233 | − | + | 5566 | 566 |

TABLE 4-continued

An example that shows how to make wideband (i.e., up to $f_{RF\alpha} \pm 952$ MHz) relative phase measurements. Changes in the LO and IF frequencies, together with variable YIG filters (bandwidth = 36 MHz) and the use of different mixer sidebands, are used to sequentially move the center frequency of the measurement band $f_{RF\beta}$ while keeping the reference band fixed at $f_{RF\alpha} = 5000$ MHz in this example.

| Common for both cases | | | f_RFβ below f_RFα | | | | f_RFβ above f_RFα | | | | Offset |
|---|---|---|---|---|---|---|---|---|---|---|---|
| f_RFα (MHz) | f_IFα (MHz) | f_IFβ (MHz) | f_LO (MHz) | SBα | SBβ | f_RFβ (MHz) | f_LO (MHz) | SBα | SBβ | f_RFβ (MHz) | f_Off (MHz) |
| 5000 | 267 | 333 | 4733 | + | − | 4400 | 5267 | − | + | 5600 | 600 |
| 5000 | 267 | 367 | 4733 | + | − | 4366 | 5267 | − | + | 5634 | 634 |
| 5000 | 333 | 333 | 4667 | + | − | 4334 | 5333 | − | + | 5666 | 666 |
| 5000 | 367 | 333 | 4633 | + | − | 4300 | 5367 | − | + | 5700 | 700 |
| 5000 | 367 | 367 | 4633 | + | − | 4266 | 5367 | − | + | 5734 | 734 |
| 5000 | 333 | 433 | 4667 | + | − | 4234 | 5333 | − | + | 5766 | 766 |
| 5000 | 367 | 433 | 4633 | + | − | 4200 | 5367 | − | + | 5800 | 800 |
| 5000 | 367 | 467 | 4633 | + | − | 4166 | 5367 | − | + | 5834 | 834 |
| 5000 | 433 | 433 | 4567 | + | − | 4134 | 5433 | − | + | 5866 | 866 |
| 5000 | 467 | 433 | 4533 | + | − | 4100 | 5467 | − | + | 5900 | 900 |
| 5000 | 467 | 467 | 4533 | + | − | 4066 | 5467 | − | + | 5934 | 934 |

TABLE 5

An example that shows how to make wideband relative phase measurements for when either $f_{RF\alpha}$ or $f_{RF\beta}$ is within the range 0.5-2 GHz, and the other frequency is within the range 0.5-20 GHz. Changes in the LO and IF frequencies, together with variable YIG filters (bandwidth = 22 MHz) and the use of different mixer sidebands, are used to sequentially move the center frequency of the measurement band $f_{RF\beta}$ while keeping the reference band fixed at $f_{RF\alpha} = 1500$ MHz in this example.

| Common for both cases | | | f_RFβ below f_RFα | | | | f_RFβ above f_RFα | | | | Offset |
|---|---|---|---|---|---|---|---|---|---|---|---|
| f_RFα (MHz) | f_IFα (MHz) | f_IFβ (MHz) | f_LO (MHz) | SBα | SBβ | f_RFβ (MHz) | f_LO (MHz) | SBα | SBβ | f_RFβ (MHz) | f_Off (MHz) |
| 1500 | 130 | 130 | 1630 | − | − | 1500 | 1370 | + | + | 1500 | 0 |
| 1500 | 130 | 150 | 1630 | − | − | 1480 | 1370 | + | + | 1520 | 20 |
| 1500 | 130 | 170 | 1630 | − | − | 1460 | 1370 | + | + | 1540 | 40 |
| 1500 | 170 | 230 | 1670 | − | − | 1440 | 1330 | + | + | 1560 | 60 |
| 1500 | 150 | 230 | 1650 | − | − | 1420 | 1350 | + | + | 1580 | 80 |
| 1500 | 130 | 230 | 1630 | − | − | 1400 | 1370 | + | + | 1600 | 100 |
| 1500 | 130 | 250 | 1630 | − | − | 1380 | 1370 | + | + | 1620 | 120 |
| 1500 | 130 | 270 | 1630 | − | − | 1360 | 1370 | + | + | 1640 | 140 |
| 1500 | 170 | 330 | 1670 | − | − | 1340 | 1330 | + | + | 1660 | 160 |
| 1500 | 150 | 330 | 1650 | − | − | 1320 | 1350 | + | + | 1680 | 180 |
| 1500 | 130 | 330 | 1630 | − | − | 1300 | 1370 | + | + | 1700 | 200 |
| 1500 | 130 | 350 | 1630 | − | − | 1280 | 1370 | + | + | 1720 | 220 |
| 1500 | 130 | 370 | 1630 | − | − | 1260 | 1370 | + | + | 1740 | 240 |
| 1500 | 130 | 130 | 1370 | + | − | 1240 | 1630 | − | + | 1760 | 260 |
| 1500 | 150 | 130 | 1350 | + | − | 1220 | 1650 | − | + | 1780 | 280 |
| 1500 | 170 | 130 | 1330 | + | − | 1200 | 1670 | − | + | 1800 | 300 |
| 1500 | 170 | 150 | 1330 | + | − | 1180 | 1670 | − | + | 1820 | 320 |
| 1500 | 170 | 170 | 1330 | + | − | 1160 | 1670 | − | + | 1840 | 340 |
| 1500 | 130 | 230 | 1370 | + | − | 1140 | 1630 | − | + | 1860 | 360 |
| 1500 | 150 | 230 | 1350 | + | − | 1120 | 1650 | − | + | 1880 | 380 |
| 1500 | 170 | 230 | 1330 | + | − | 1100 | 1670 | − | + | 1900 | 400 |
| 1500 | 170 | 250 | 1330 | + | − | 1080 | 1670 | − | + | 1920 | 420 |
| 1500 | 170 | 270 | 1330 | + | − | 1060 | 1670 | − | + | 1940 | 440 |
| 1500 | etc. | etc. | etc. | + | − | etc. | etc. | − | + | etc. | etc. |

TABLE 6

Description of the switched IF filter banks that are used to avoid aliasing in the Nyquist band ADCs. The high-frequency modules (FIG. 11) employ a fixed 200 MSa/S clock and the filters shown in columns 4 and 5. The low-frequency module (FIG. 12) employs a dual clock design (i.e., it uses both 200 MSa/S and 171.4 MSa/S clocks) in order to allow for sequential banded measurements over the entire 500 MHz input bandwidth.

| | Clock = 1200/6 = 200 MSa/S | | | | Clock = 1200/7 ≈ 171.4 MSa/S | | | |
|---|---|---|---|---|---|---|---|---|
| Nyquist | Nyquist frequencies | | Filter cutoffs | | Nyquist frequencies | | Filter cutoffs | |
| band number | Lower MHz | Upper MHz | Lower MHz | Upper MHz | Lower MHz | Upper MHz | Lower MHz | Upper MHz |
| 1 | 0 | 100 | 0 | 93 | | | | |
| 2 | 100 | 200 | 116 | 184 | 85.7 | 171.4 | 90 | 120 |
| 3 | 200 | 300 | 216 | 284 | 171.4 | 257.1 | 180 | 230 |
| 4 | 300 | 400 | 316 | 384 | 257.1 | 342.9 | 275 | 325 |
| 5 | 400 | 500 | 416 | 484 | 342.9 | 428.6 | 372 | 418 |
| 6 | | | | | 428.6 | 514.3 | 460 | 500 |

TABLE 7

Description of the switched IF filter banks that are used to avoid aliasing in the 200 MSa/S Nyquist band ADCs.

| Nyquist | Nyquist frequencies | | Filter cutoffs | | Bandwidth used | |
|---|---|---|---|---|---|---|
| band number | Lower MHz | Upper MHz | Lower MHz | Upper MHz | Lower MHz | Upper MHz |
| 1 | 0 | 100 | 89 | 91 | 89 | 91 |
| 2 | 100 | 200 | 116 | 184 | 178 | 182 |
| 3 | 200 | 300 | 216 | 284 | 267 | 273 |
| 4 | 300 | 400 | 316 | 384 | 356 | 364 |
| 5 | 400 | 500 | 416 | 484 | 445 | 455 |

What is claimed is:

1. A method of measuring signals over a continuous and wide bandwidth, said method comprising:
   using baseband frequency signals, which are repeatable, clocked, and triggered, and which are up-converted to radio frequency signals to create a transmitter signal;
   using a common local oscillator for two or more receiver channels and the transmitter signal;
   measuring upper and/or lower mixer sidebands along with a varying intermediate frequency;
   comparing successive measurements of the signal in sequential frequency-stepped measurement bands with those signals that are simultaneously measured in a fixed-frequency reference band;
   using changes in the common local oscillator frequency and intermediate frequencies, together with variable YIG filters, to sequentially move the center frequency of each measurement band while keeping the reference band fixed;
   using a repeatable, clocked, and triggered analog-to-digital converter to measure these signals;
   using a predetermined table to determine which analog-to-digital converter Nyquist band and which mixer sideband is used for each offset frequency band;
   using the same mixer sidebands for close-in measurements; using two different mixer sidebands for wideband measurements; using multiple sets of these reference and offset frequency bands together to create ultra wideband measurements;
   thereby measuring absolute magnitudes and absolute phase relationships over a continuous and ultra wide bandwidth.

2. A method of measuring harmonically related signals over a wide bandwidth, said method comprising:
   using baseband frequency signals, which are repeatable, clocked, and triggered, and which are up-converted to radio frequency signals to create a transmitter signal;
   using a common local oscillator for two or more receiver channels and the transmitter signal;
   measuring the harmonics produced by a non-linear device-under-test with receivers which have offset center frequencies;
   using a tunable filter in a first receiver, which selects a fundamental frequency; using this fundamental frequency as a reference for absolute magnitude and phase measurements at other frequencies;
   using a tunable filter in a second receiver, which selects successive harmonics for analysis;
   measuring simultaneously said fundamental frequency in first receiver and said nth harmonic frequency in second receiver; measuring with first and second receivers in said way multiple times to successively measure additional harmonics;
   using fundamental mixing to down-convert, the fundamental signal to an intermediate frequency;
   using nth harmonic mixing to down-convert the nth harmonic signal to the nth intermediate frequency band within the analog-to-digital converter bandwidth;
   thereby measuring the absolute magnitude and absolute phase relationships of harmonics over a continuous and ultra wide bandwidth.

* * * * *